United States Patent [19]

Jongebloed

[11] Patent Number: 5,667,079
[45] Date of Patent: Sep. 16, 1997

[54] AUTOMATED MULTI-GRADE WASTEPAPER RECYCLE CENTER SORTING SYSTEM

[76] Inventor: Kenneth W. Jongebloed, 1860 N. Atlantic Ave., B-407, Cocoa Beach, Fla. 32931

[21] Appl. No.: 506,384

[22] Filed: Jul. 24, 1995

[51] Int. Cl.$^6$ ................................................. B07C 5/346
[52] U.S. Cl. .................... 209/589; 209/930; 209/705; 209/942
[58] Field of Search ................................ 209/589, 930, 209/703, 705, 653, 942

[56] References Cited

U.S. PATENT DOCUMENTS

| | | | |
|---|---|---|---|
| 4,123,489 | 10/1978 | Kelley | 264/141 |
| 4,334,984 | 6/1982 | Vagac et al. | 209/3 |
| 4,867,383 | 9/1989 | Terry et al. | 241/24 |
| 5,100,537 | 3/1992 | Krause | 209/2 |
| 5,101,977 | 4/1992 | Roman | 209/3 |
| 5,123,993 | 6/1992 | Wiggins | 156/584 |
| 5,148,758 | 9/1992 | Saly et al. | 110/220 |
| 5,169,588 | 12/1992 | Estepp | 209/930 X |
| 5,184,780 | 2/1993 | Wiens | 241/19 |
| 5,197,678 | 3/1993 | Trezek et al. | 241/21 |
| 5,263,591 | 11/1993 | Taormina et al. | 209/930 X |
| 5,333,797 | 8/1994 | Becker et al. | 209/930 X |
| 5,339,962 | 8/1994 | Sommer, Jr. et al. | 209/576 |
| 5,465,847 | 11/1995 | Gilmore | 209/930 X |

*Primary Examiner*—D. Glenn Dayoan
*Attorney, Agent, or Firm*—Brian S. Steinberger; Law Offices of Brian S. Steinberger

[57] ABSTRACT

An automated multi-grade wastepaper recycle center and sorting system is provided. The center is a multi-acre fenced-in complex having security that allows for recycling trucks to deliver multiple grades of wastepaper for separating and sorting to one location prior to pulp processing and deinking type processes. Collection trucks leave their loads in one of four drop pits where different conveyor systems start the sorting process. A novel swivel conveyor system can remove papers from the drop pit for temporary storage on various locations on a primary segregation floor where plied papers can later be recycled into main pit area when needed. Alternatively, loads from the drop pits can be conveyed to the main pit area directly and then presorted onto different conveyor systems. One conveyor can then send wastepaper through a star-wheel sorter system that can separate desired grades of paper. Another conveyor can pass papers through an x-ray station and then hand separated through specialized waste collection stations and drops. Sorted papers can later be sent to a bailer system for bailing and/or separated papers can also be resorted through the various sorters over and over as needed. The bailed papers can later be sent to additional outside recycling processes such as but not limited to deinking and the like. The complex allows for the bailed papers to be delivered to the additional recycling locations such as ones for pulp processing and deinking operations by railroad lines and/or also by trucks.

14 Claims, 19 Drawing Sheets

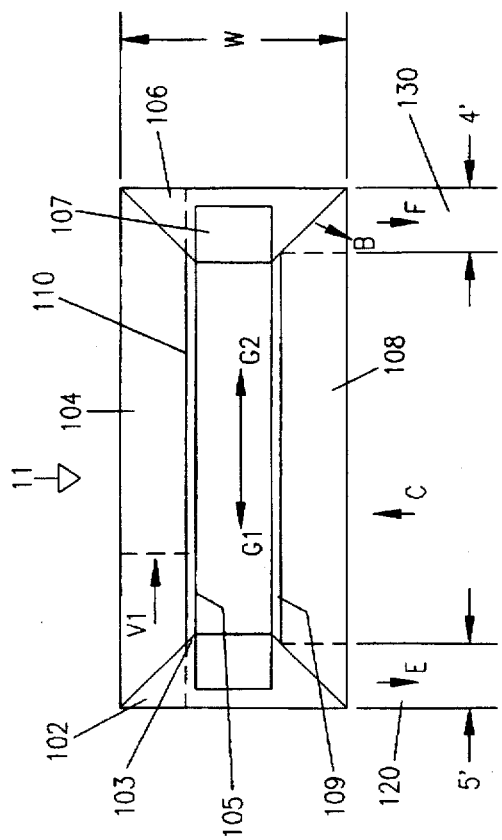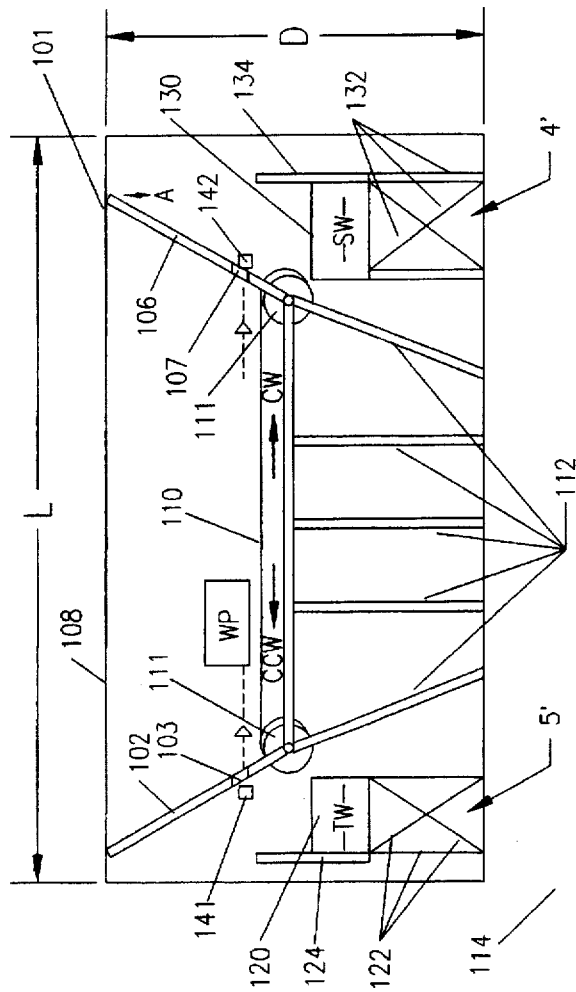

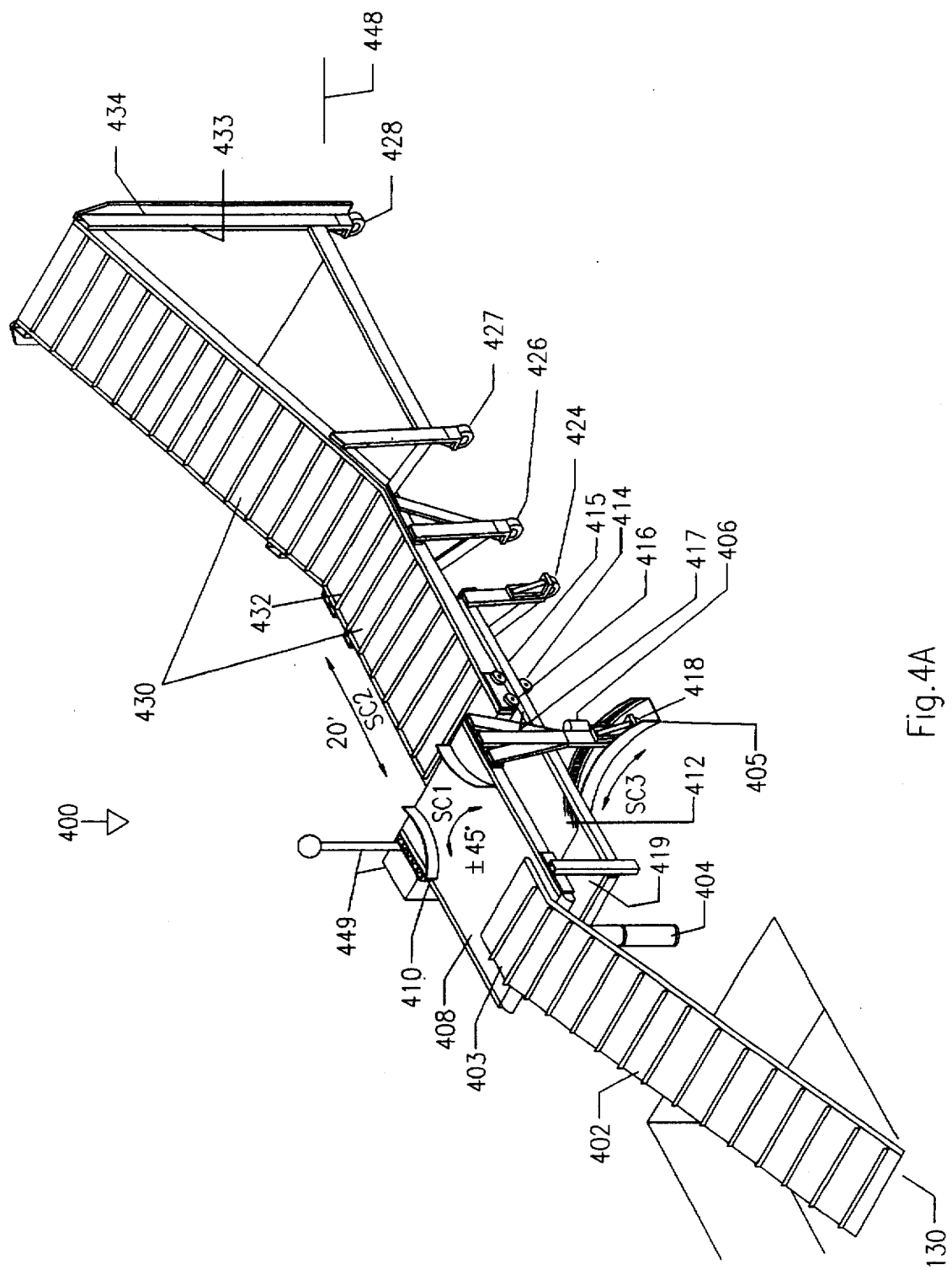

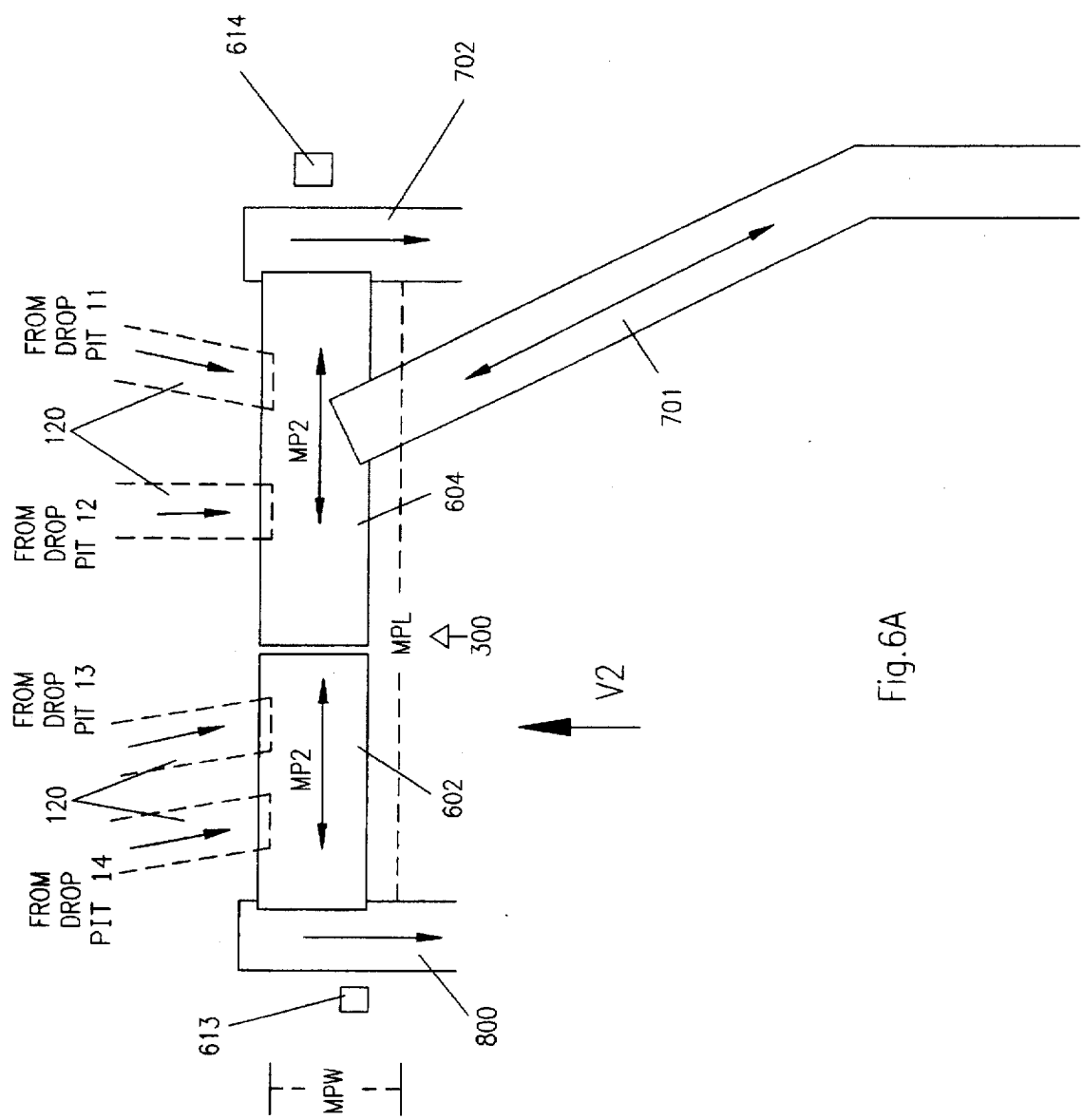

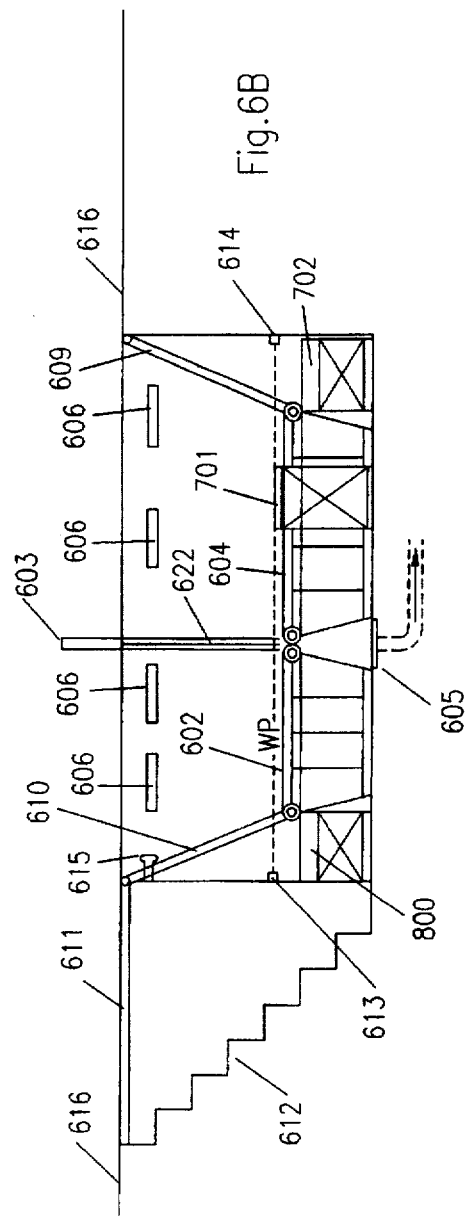
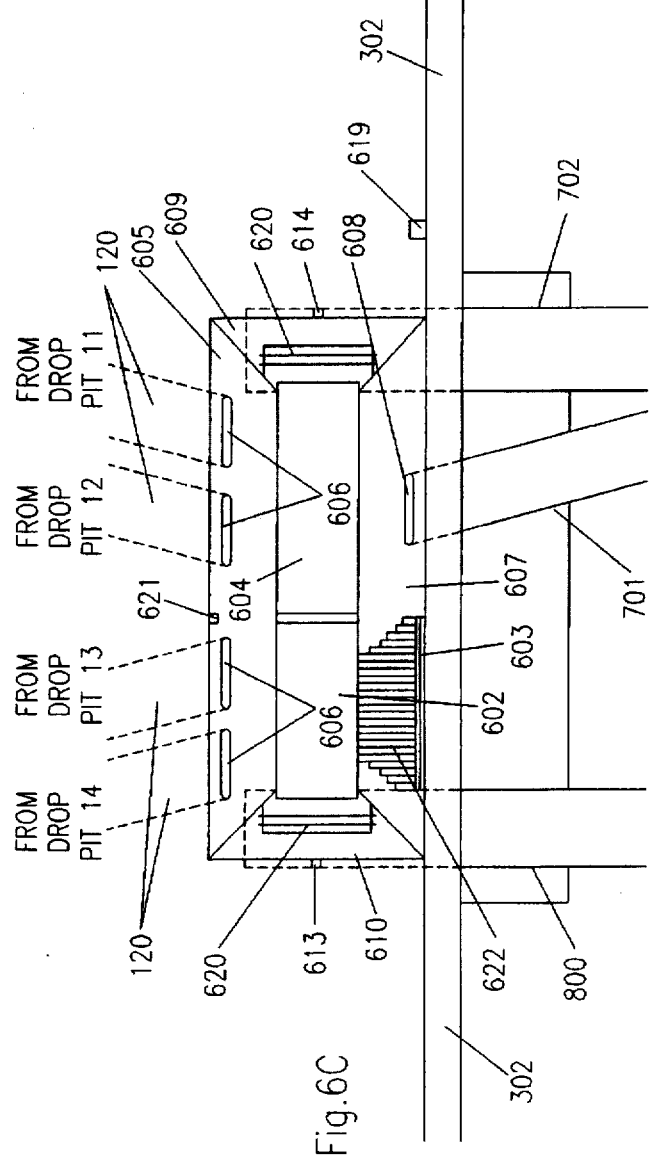

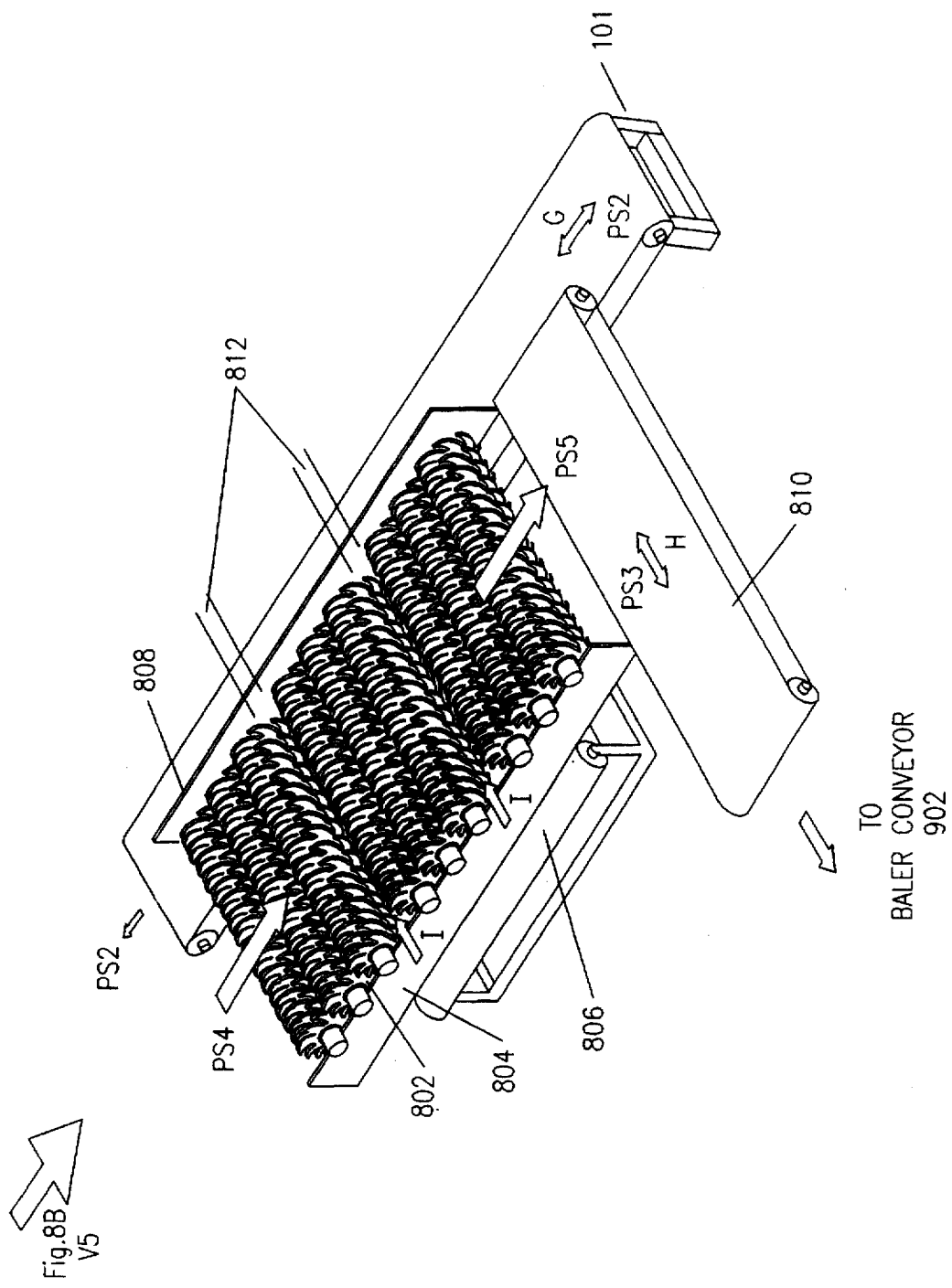

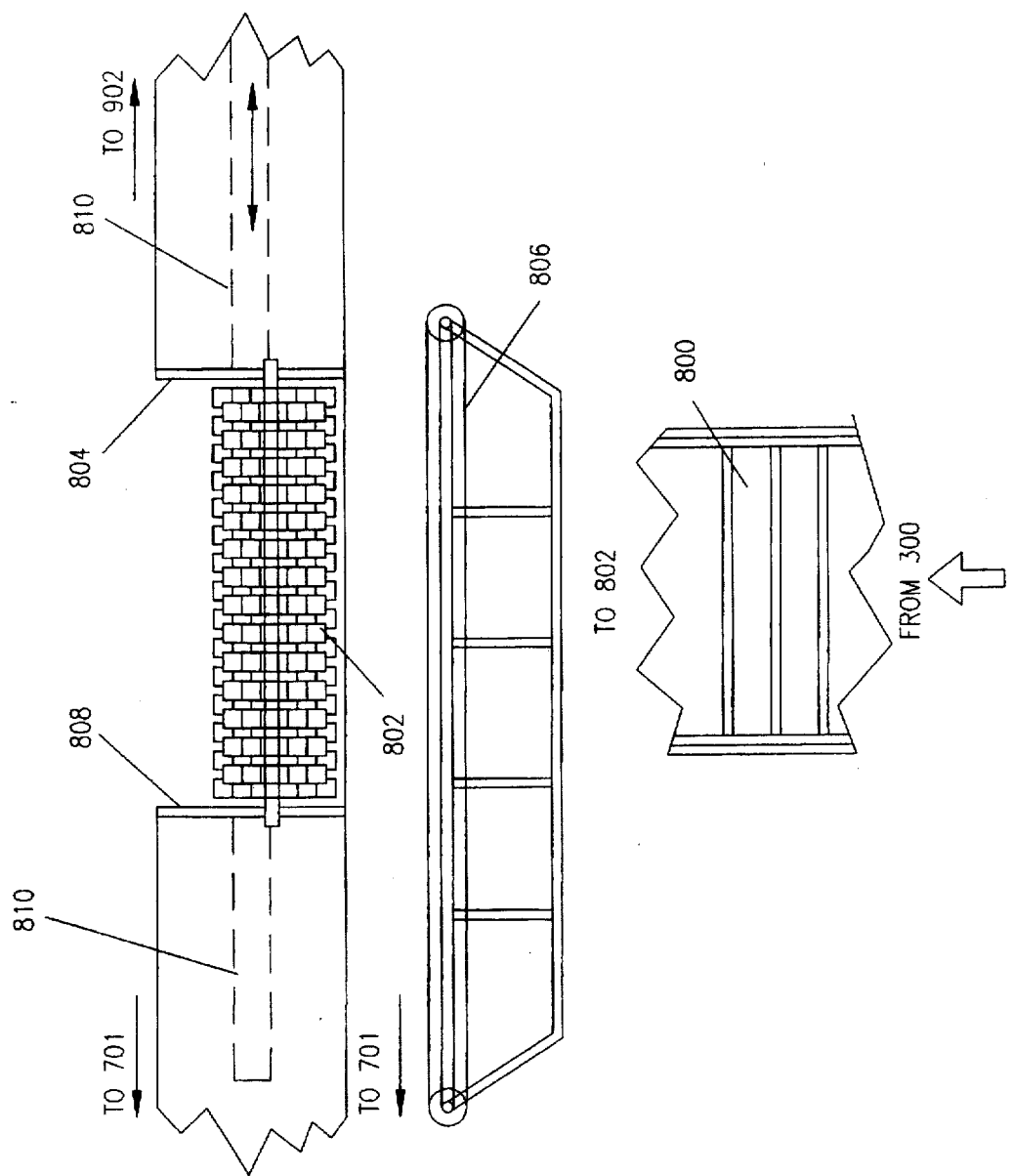

AUTOMATED MULTI-GRADE WASTEPAPER RECYCLE CENTER SORTING SYSTEM

This invention relates to recycling systems, and in particular to an efficient and effective method and system for recycling wastepaper collected from the waste stream, and sorting by grade for deinking and reuse.

BACKGROUND AND PRIOR ART

Current recycling systems for wastepaper are generally inefficient. Less than forty (40) percent of wastepaper is generally collected for recycling. The remaining wastepaper is used primarily for landfills and the like. The six commonly accepted groups of paper are printing/writing, newspaper, cardboard, box board, packaging, and tissue paper. Instead of recycling, most of these groups of wastepaper eventually become landfill material.

The problems associated with recycling wastepaper are caused by the difficulty in collecting and handling the wastepaper, the added expense of the sorting operation and the difficult and costly problem of deinking the wastepaper for reuse. Past deink methods result in their own inherent problems such as producing highly caustic polluting chemicals. Furthermore, most of the recycled wastepaper that has been deinked has been generally limited to reuse only as a lower grade paper, or as tissue paper. Most high printing/writing grades of wastepaper are not deinked for reuse as a high grade recycled writing/printing paper pulp.

Current methods for supplying high grade paper are usually limited to virgin wood pulp which results in the cutting of forests. Furthermore, sources of fresh wood material are already becoming exhausted in many countries throughout the world. While at the same time there is a growing need for all grades of paper products throughout the world. Also, the electricity requirements and thus oil imports to run the electrical generators can require approximately 16 kilowatt hours (KWH) per ton for changing virgin wood into paper, where as it only requires 5 KWH per recycled paper ton.

In the near future, a new enzymatic technique that is nonpolluting holds promise to allow for the deinking of most grades of paper including printing/writing grades for reuse as high grade writing paper. However, present methods do not allow for adequate recycling of most wastepaper grades.

The current prior art techniques for processing wastepaper are inadequate for sorting. These patents are primarily limited to pulping and shredding type operations and not primarily to sorting. See U.S. Pat. Nos. 4,017,033 to Tra; 4,123,489 to Kelly; 4,334,984 to Vagac et al.; 4,867,383 to Terry et al.; 5,184,780 to Wiens; and 5,197,678 to Trezek et al. These prior art systems generally sort and thus recycle less than forty (40) percent of wastepaper for later reuse.

Thus, the need exists for a system to efficiently and economically allow for the sorting of all grades of wastepaper for recycling purposes.

SUMMARY OF THE INVENTION

The first objective of the present invention is to provide a wastepaper recycling center that requires minimum human handling.

The second object of this invention is to provide a recycling system that is dedicated to the processing of post consumer wastepaper.

The third object of this invention is to provide a recycling system with the lowest cost per ton to recycle wastepaper.

The fourth object of this invention is to provide a wastepaper recycle system that has the ability to efficiently sort through all grades of wastepaper delivered.

The fifth object of this invention is to provide a system for separating and sorting wastepaper in an efficient and thorough manner before deinking processes are done.

The sixth object is to provide a system that provides in-door processing of 300 tons daily, in a 50,000 square foot center.

The subject invention allows for the sorting and recycling of low and high grade post grade consumer wastepaper prior to any deinking processes.

The subject invention allows for the sorting and recycling of low and high grade post grade consumer wastepaper prior to any pulping and shredding type operations.

Of the six commonly accepted groups of paper, the invention can sort all but the tissue group which is not desired as a furnish to a pulp mill.

Further objects and advantages of this invention will be apparent from the following detailed description of a presently preferred embodiment which is illustrated schematically in the accompanying drawings.

BRIEF DESCRIPTION OF THE FIGURES

FIG. 3A shows a top view of a single drop pit used in the recycling center invention of FIG. 1.

FIG. 3B is a side view of the single drop pit of FIG. 3A along arrow C.

FIG. 4A is a perspective view of the swivel conveyor used in the recycling center invention of FIG. 2.

FIG. 6A is a top view of the main pit used in the recycling center invention of FIG. 2.

FIG. 6B is a side view of the main pit area of FIG. 6A along arrow V2.

FIG. 6C is another top view of the main pit of FIG. 6A in greater detail.

FIG. 8A is a perspective view of the presort-star screen machinery used in the invention of FIG. 2.

FIG. 8B is a side view of the presort star machinery of FIG. 8A along arrow V5.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
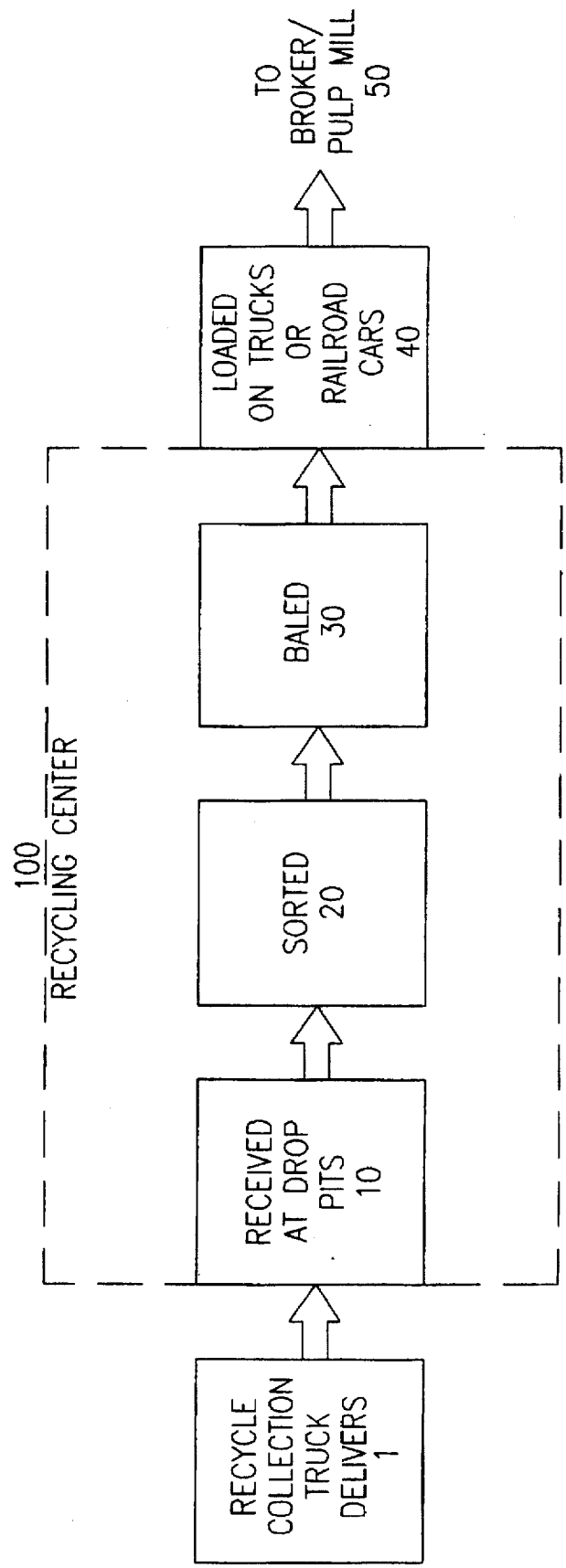
FIG. 1 is a flow chart of the five main steps used in the recycling center invention.

FIG. 1 is a flow chart of the five main steps used in the invention. In step 1, recycle collection trucks 1 deliver collected wastepaper to drop pits 10. From the drops pits the invention allows for the sorting 20 and baling 30 of the sorted wastepaper in order to be loaded onto trucks or railroad cars 40 where the bales are then delivered to pulp mills for recycling. Steps 10, 20 and 30 are the main steps accomplished at the recycling center invention, 100 illustrated in FIG. 2.

Figure 2:
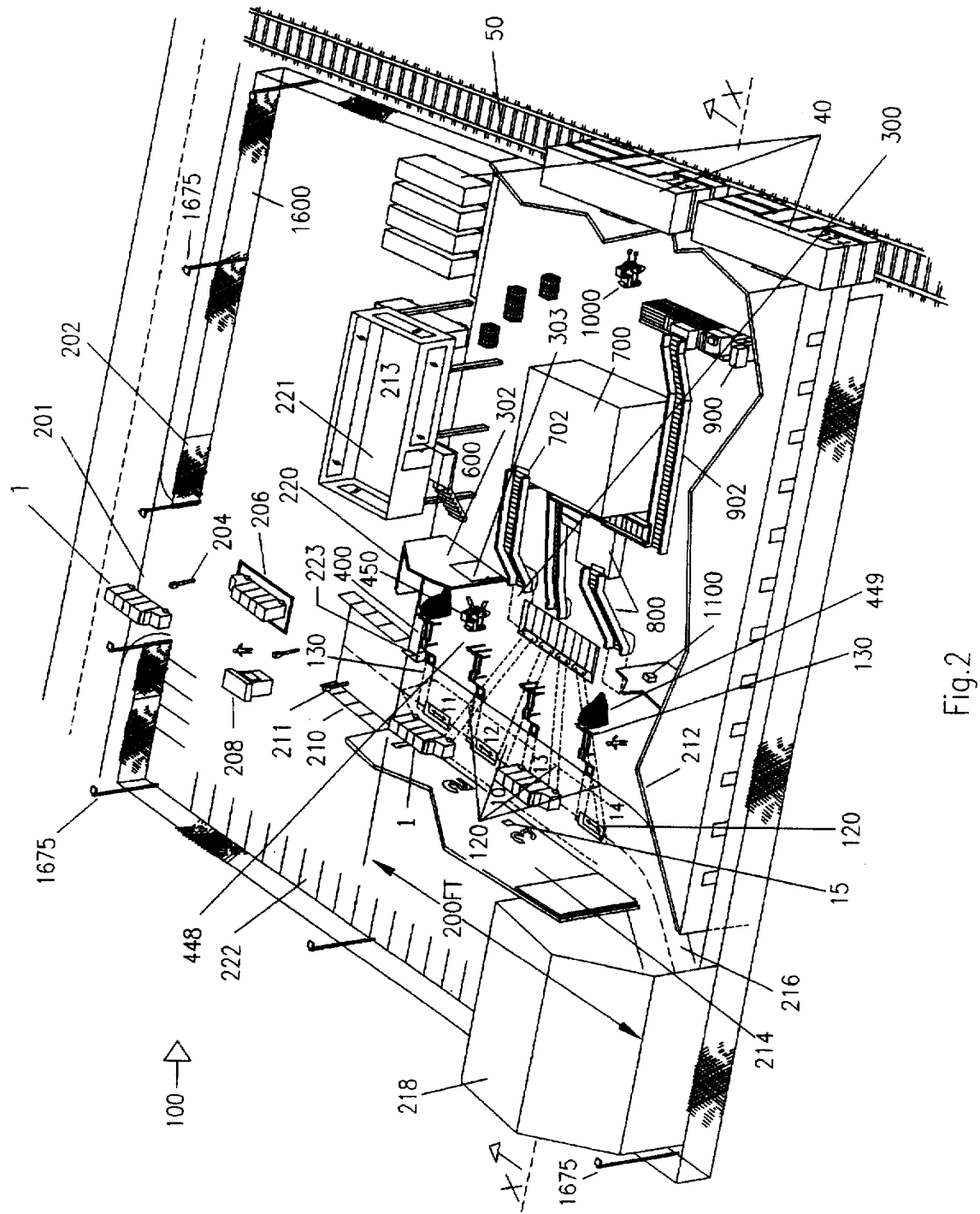
FIG. 2 is a perspective view of the actual recycling center of the subject invention.

FIG. 2 illustrates a preferred embodiment of the recycling system center of the subject invention. Many jurisdictions have some type of curbside and initial recycle program for presorting several types of postconsumer grades of wastepaper. Sources of wastepaper for recycling can include private residences, government facilities, offices and commercial and industrial businesses from which wastepaper is collected. Six grades that can be collected from curbside type pickups are the following: 1. newspaper; 2. paperboard (corrugated and solid bleached sulphate (SBS) box board) 3. computer print out paper; 4. packaging; 5. mixed office waste (ledger/bond paper); and 6. magazines.

These six grades can correspond to the four types of loads and compartments that a recycling track 1 can pick up. The four compartments with their respective loads on the recycling track corresponds to four drop pits, 11–14 at the recycling center 100. Generally, four grades of wastepaper can be expected to be picked up at any one type source route stop (i.e. residence, business, and the like). For example, residences would have little or no computer print out or ledger; commercial establishments would have little or no magazines or newspaper. For circumstances when a track does carry more than four grades there can be pit assignments. The curbside recycle sorting process itself are generally by local community Governments and/or a commercial waste collection company. The recycling center invention, 100 has great versatility to meet the needs of local municipalities current recycling programs for wastepaper. Coordination of collection truck routing permits four or five drop pits to handle the six most common broad grades. Pits 1 through 3 corresponding to 11–13 can be reserved for the three most common grades for the geographic area in which the center is located; these grades can include newspaper, paperboard, and magazines. Pit 4, shown as 14 can be for a paper grade(s) that can change depending upon the day of the week. For example, Monday may be ledger paper, Tuesday through Thursday mixed office waste, Friday computer print out, and Saturday packaging. Routing logistics for additional pits can be coordinated with the collection/ delivery company dispatcher. On a typical day, 30 to 40 trucks can unload at drop pits 11–14 which accounts for loads of approximately 8 to 10 tons per delivery at the recycling center 100, or approximately 300 tons daily.

Referring to FIG. 2, a recycle collection truck, 1 enters the recycle center though remotely operated fence gates 202 which can be controlled gate opener control 204 and by a manned guard house 208. The track can then be weighed on the drive-on scale 206, such as a Weight-Tronix Model 7010-100T, from Fairmont, Minn. Next, the truck drives up in ramp 210 toward the drop pits 11 to 14, which is part of the closed building 212. The roof of the building 212 is open in this Figure to more clearly show the interior. Referring to FIG. 2, each drop pit can be numbered with large numerals from "1" to "4" as shown by the adjacent wall 214 and as referred to as 11 to 14 and be used as a deposit for different wastepaper type grades. For example, pit 12 can be for depositing old newspapers, and pit 14 can be for depositing old corrugated cardboard (OCC). If a truck 1, has more than four compartments on board (more than four types of wastepaper), the truck can drop off the four grades of 11 to 14, drive down exit ramp 216 to circle the building and come back through opening 201 and pass over the pits 11–14 where the swivel conveyors 130 (to be discussed later in reference to FIG. 4A) can be repositioned for the different grade. Infrared (IR) sensor (15) is used to select which of the four drop pits is active; i.e., feeding the main pit.

Operations may require a pit change due to equipment malfunction, or any larger than normally expected grade delivery, so the driver will be alerted by the guard 208 of pit reassignments. A large lighted sign (not shown) containing multi-grade sections located on the wall at each drop pit can be selectively lit, which will advise the driver of the grade assigned to a particular pit to preclude the accidental dropping of an incorrect load. Each track, 1, can either straddle the drop pits 11–14, or drive along the right or left side of the pits. The location of the tracks depends upon whether each truck unloads from the bottom, rear, right side, or left side. Conventional mirrors (not shown) can be placed on the wall along side of the drop pits to help the driver to properly position the track over the pit when unloading from a rear or bottom type truck. Additional mirrors (not shown) can be suspended from the ceiling at an angle, in the front of each drop pit, which can further help the driver line up with the pit and reduce the chance of a truck tire going into a pit. An entrance ramp door (not shown) having conventional clear plastic straps which provide the drivers a view of the center interior, and which can be lowered during high wind conditions. In addition, the entrance contains a sliding conventional moveable door (not shown) which can be used to secure the center 100 during hours of shutdown. Conventional ceiling exhaust fans (not shown) can remove truck(s) 1 and front loader 450 exhaust fumes. Communication between the guard house 208, pits operator 211, and floor manager, 212 can be maintained with the use of conventional two-way hand-held radio type transceivers. The guard 208 can keep a pit operator, 211 advised of any driveups, or the pit operator, 211 can advise the guard 208, of any pit assignment changes, and the like. A floor manager, 213 can be used to monitor all activities. The floor manager can be constantly roving or located in office, 221.

Figure 9:
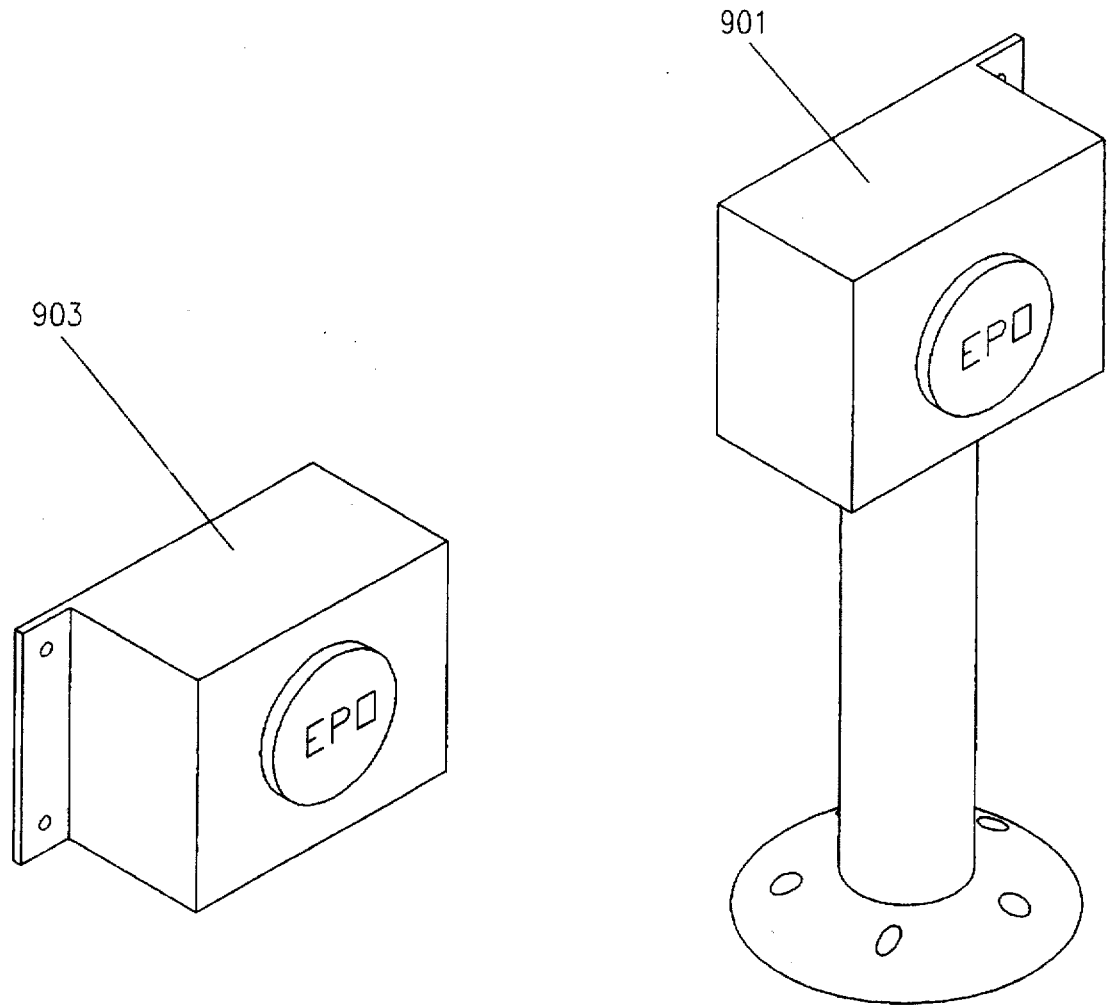
FIG. 9 is a perspective view of emergency power off switches used in the invention of FIG. 2.

Referring to FIG. 2, safety can be maintained in the drop pits area by limiting access. Because track(s) 1 must be able to straddle drop pits 11–14, and a front loader/pusher, 450 must have access to the main pit 300, safety railings cannot be provided. Access can be limited to the drop pits by either or both on operator, 211 and floor manager, 213. Truck drivers should remain in their cabs, and driveup customers can be restricted from entering the drop pits area, 210 by the use of conventional guard rails (233). Large red mushroom type conventional panic buttons marked EMERGENCY POWER OFF, can be located on posts 901 and walls 903, as shown in FIG. 9, that are throughout the center and can be pressed to instantly remove power from all conveyors and machinery in the event of an emergency. Building lighting is not effected by activation of an Emergency Power Off switch.

Figure 10:
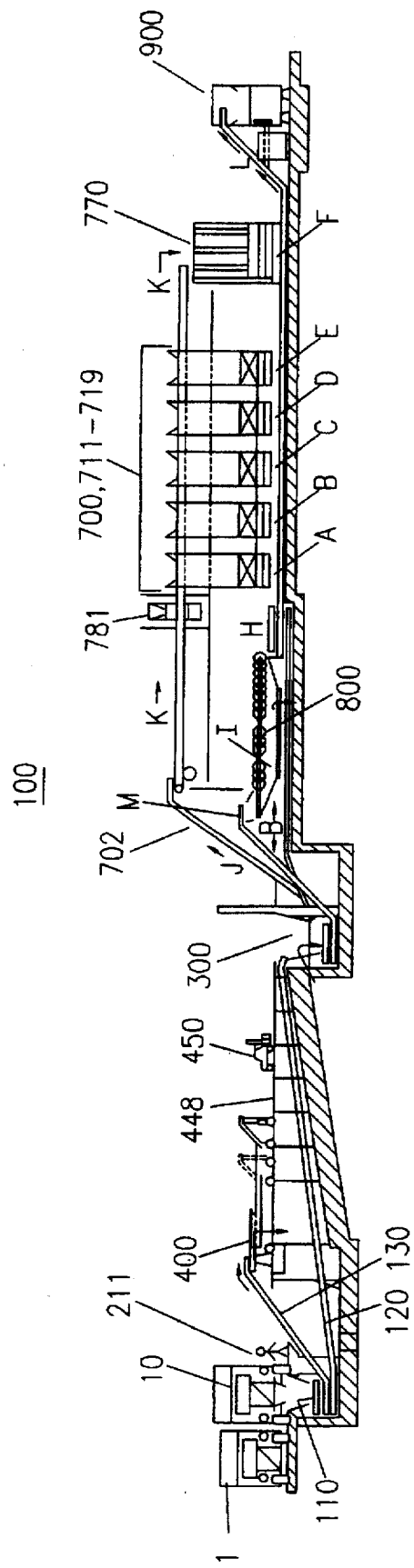
FIG. 10 is a cross-sectional view of the invention of FIG. 2 along arrow X.

Referring back to FIG. 2, truck(s) 1 can exit the center via a down ramp 216 through an adjacent storage shed 218 and employee parking lot 222, and can be weighed at scale 206 upon leaving to determine the paper load weight delivered. The shed floor can be of concrete construction, the employee parking lot 222 can be asphalt paved. Entry and exit weights of truck(s) 1 can be entered into an ledger system by the guard 208, and can be retrievable at the office, 221. The shed 218 provides extra storage space in the event of an equipment or machinery malfunction which could last for an extended length of time. Note that FIG. 10 is a cross-sectional view of the invention of FIG. 2 along arrow X.

Figure 3C:
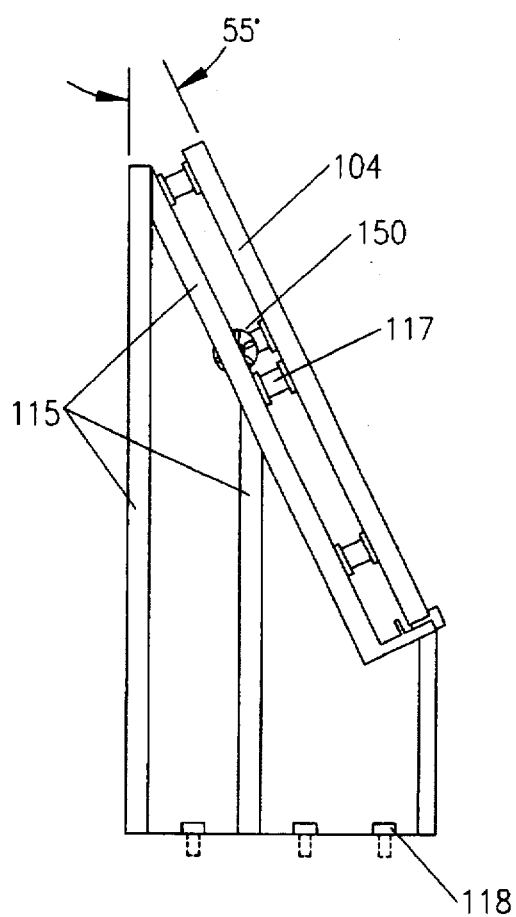
FIG. 3C is a cross-sectional view of the rear side plate and frame of FIG. 3A along arrow V1.

FIG. 3A shows a top view of a single drop pit 11 used in the invention of FIG. 1. FIG. 3B is a side view of the single drop pit 11 of FIG. 3A along arrow C. All the drop pits 11–14 have similar components and dimensions. The top 101 of each drop pit is level with the building concrete floor of drop pit surface area, 10, so that any debris can easily be pushed into the pits and fall down into the pit floor, 114. Referring to FIGS. 3A and 3B, drop pit 11 has a depth D of approximately ten feet and a length, L, of approximately thirty-four feet, and a width, W, of sixty inches (five feet). The bottom of the drop pit has a concrete floor, 114. Each pit is sized to permit a typical truck, 1 to straddle it and can include indented tire guide tracks (not shown) on surface areas 101 to help guide the truck into a straddled alignment over a pit, 11. Inside each pit, a reversible electrically driven conveyor belt 110 is supported by rotatable pulleys 111 and a support frame 112. The conveyor belt, 110 can be approximately twenty-eight feet long, four feet wide with a six-pitch combination heavy duty belt that is powered by a 460VAC 3-phase electrical driven 3-horsepower (HP) motor. Left and right end metal plates 102 and 106 are oriented at an angle A, of approximately fifty five degrees on the ends of the conveyor belt 110. Openings 103 and 107 having a width of approximately four feet, and heights of approximately three feet are located in each respective end plates 102 and 106. Rear side metal plate 104 and front side metal plate 108 are also slanted at an angle of approximately fifty five degrees and create a rectangular type funnel opening (more clearly shown in FIG. 3A and 3C) with end plates 102 and 106. Rear side plate 104 and front side plate 108 reach from the top edge of the pit 101 to within one inch of the conveyor belt 110 as illustrated by the openings 105, 109 in FIG. 3A.

Figure 3D:
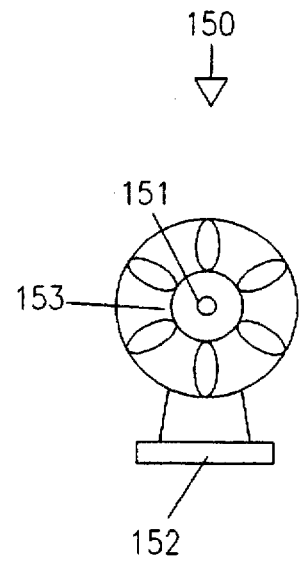
FIG. 3D is a perspective view of a shaker motor.

FIG. 3C is a view of pit plate (104) showing vibration isolators (117) and channel (116) which support pate (104) and are blotted to support frame (115). Bolts (118) hold frame to pit floor. A motor (150) is bolted to plate (104) via motor frame mount (152) shown in FIG. 3D. The motor shaft (151) contains a concentric weight (153) which provides vibration to keep paper moving down the plates to the conveyor belt.

Referring to FIG. 3A and 3B, a reversible conveyor belt 110 can rotate either in the direction of arrow G1 or in the direction of arrow G2 depending on the infrared remote controls set by a pit operator, 211. When rotating counter-clockwise in the direction of arrow G1, wastepaper, WP passes through end plate opening 103 and on to trench conveyor belt 120 which rotates in the direction of arrow E. Trench conveyor 120 is shown more clearly in FIG. 5A. Referring to FIGS. 3A and 3B, trench conveyor 120 is supported by frame members 122 on concrete floor 114 and includes a side wall 124 for allowing wastepaper, WP to stay on the conveyor belt 120. Trench conveyor 120 has a width, TW, of approximately five feet. When reversible conveyor 110 rotates clockwise in the direction of arrow G2 wastepaper passes through side opening 107 and on to conveyor 130 that leads to the swivel conveyor 400 (shown more clearly in FIG. 4A) which starts rotating in the direction of arrow F. As shown in FIG. 3B, 4A swivel conveyor 130, including sections 130 and 430 have a width SW, of approximately four feet, and section 408 has a width of five feet. Conveyors 110, 120 and 130 as well as the other conveyors in the invention can be electrically driven by variable speed motors with solid state speed controllers, and can be automated by a programmable lead controller (PLC) and the like for start/stop sequencing. The conveyors can also contain raised cleats to help the movement of paper, and do so when the conveyor is at an incline. Furthermore, sidewalls and skirts can be included on the conveyors as needed to help prevent the loss of paper.

Referring again to FIGS. 3A and 3B, a conventional photoelectric cell (model, multi-beam TTR, by Banner Engineering Corp. of Minneapolis, Minn.) (electric eye beam) 141 can travel approximately one inch above and across the conveyor belt 110 to a receiver 142. Photoelectric cell beam 141–142 is used to determine whether wastepaper, WP, is located on belt 110. When there is little or no paper on the belt, the circuit is completed by the beam reaching the receiver 142, which can cause power to be removed from the drop pit conveyor, 110. There can be a power off delay of approximately fifty seconds to permit any paper on either the trench conveyor 120 or the swivel conveyor 130 to be delivered along their respective belts before these belts are also powered off. Again, conveyor 130 leads to the swivel conveyor 400 which is described in reference to FIG. 4A. Referring to FIG. 3A and 3B, the power off feature can reduce electrical costs and equipment wear and tear. A pit operator can overide the photoelectric cell beam 141–142 with on/off button 461 as shown in FIG. 4B.

FIG. 4A is a perspective view of the swivel conveyor 400 used in the invention of FIG. 2. The swivel conveyor 400 can be operated by handheld infrared remote control using known types of controls. Swivel conveyor 130 consists of three sections: sections 402, 408 and 430. The three swivel conveyors located at the three "inactive" drop pits can be activated by an electric eye (similar to the one described previously during the unloading of wastepaper into its associated drop pit. The swivel conveyors purpose is to temporarily store a paper group on the center floor until ready for sorting into specific grades for baling. Section 130 is a four foot wide cleated belt that runs horizontally under the floor. It exits via pit 401, is inclined upward 30 degrees to above the five foot wide section 408. It then runs horizontally one foot overlapping Section 408 so no paper is lost when Section 408 is rotated ±45 degrees. At start of the day delivery shift, Section 430 is extended fully and rotated right or left as commanded by the hand-held remote control until a pile of paper (FIG. 2, 449) near the height of the conveyor is deposited on the floor. It then is retracted to clear the pile and rotated left or right so another pile can be made.

Figure 4B:
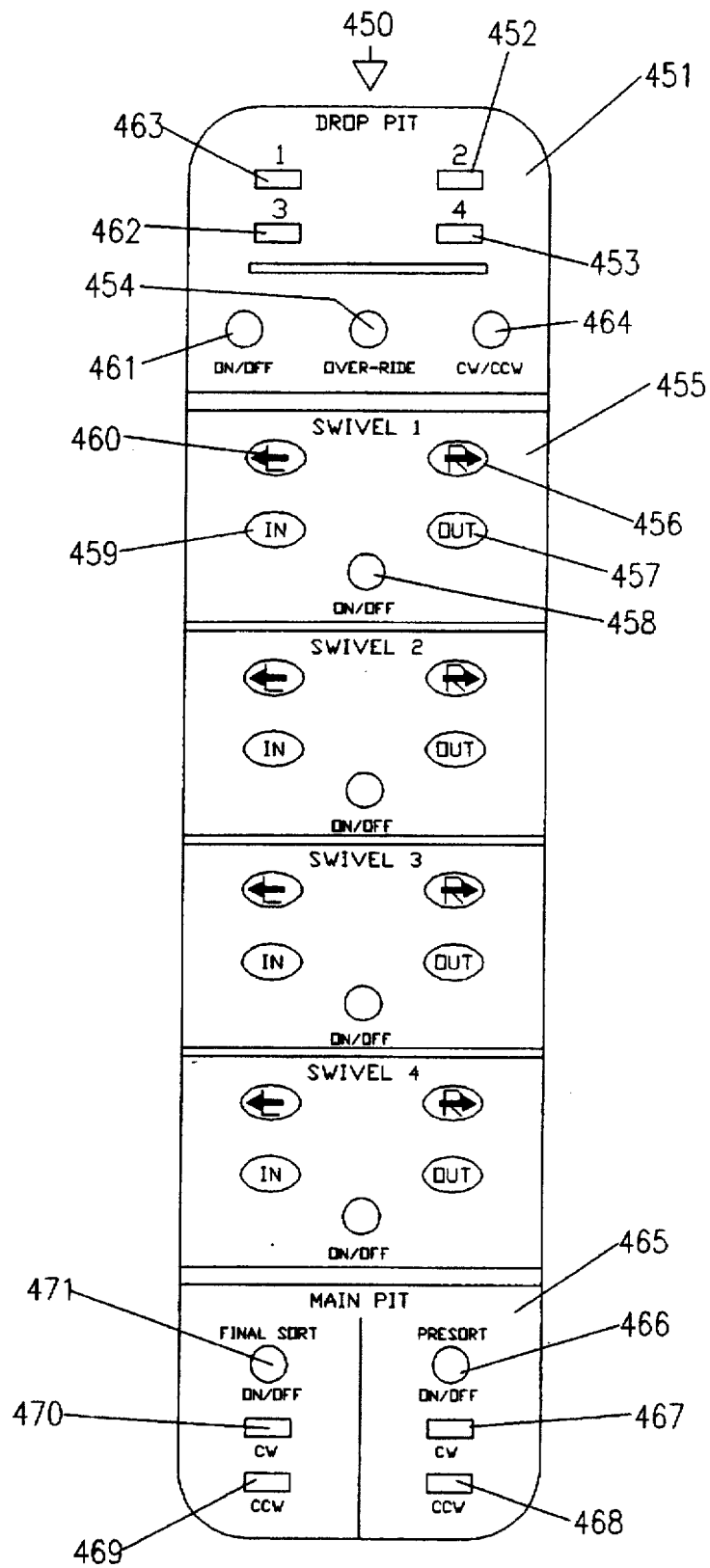
FIG. 4B is a perspective view of the IR hand-held remote control used with the invention.

FIG. 4B shows a hand-held battery powered infrared (IR) remote control 450 (such as custom manufactured by Commander Control, Inc. of East Brunswick, N.J.) which is comprised of six areas. The drop pits control area 451 is at the top edge closest to the IR transmitter. There are four identical areas for control of the four swivel conveyors 455. The sixth area 465 is for control of main pit 300.

The drop pits operator 211 points the infrared remote control at the drop pits IR sensor FIG. 2, 15 mounted on the wall along side the drop pits, and presses any one of the drop its area 451 four numbered buttons shown in FIG. 4B 1, 2, 3 and 4 element, 452, 453, 462 and 463. If button 4 463 is selected, drop pit 4 is "active" and its conveyor belt rotates counterclockwise (viewed from main pit) delivering paper to its associated trench conveyor. The other three drop pits go into an "inactive" mode status and their conveyor belts rotate clockwise delivering paper to their respective swivel conveyors. If no paper is sensed in the drop pit by its electric eye system, the conveyors (drop pit, trench or swivel) for that pit rotate for fifty seconds to clear paper enroute and then go into a standby power down mode.

If the drop pits operator 211 wants to activate two drop pits at the same time, (such as for feeding corrugated cardboard mixed with paper to the pre-sort machine from pit 4 while pit 1 is also active) OVERRIDE button 454 is pressed, followed by the 4 button 453. This now causes both drop pits 1 and 4 conveyors to rotate counterclockwise delivering paper to their trench conveyors.

The drop pits operator 211 can also individually and manually (not part of the PLC sequence or electric eye system) start or stop a drop pit conveyor by pressing ON/OFF button 461 followed by the pit number button 1, 2, 3 and 4 element, 452, 453, 462 and 463. In this case, either the trench or swivel conveyor operates for fifty seconds to complete delivery of paper enroute on either conveyor.

All three drop pit area circular buttons 454, 461 and 464 of FIG. 4B are toggles, and repeating the action causes the drop pit addressed to revert back to its previous state.

The drop pits operator 211 points the remote at a swivel conveyor IR sensor 449 FIG. 4A and controls it from its respective area, 455. To move the swivel conveyor right from its zero (0) degree position the R button, 456 is held depressed until the desired positions obtained. To move the conveyor left the L button, 460 is held depressed. Holding the OUT button 457 depressed causes Section 430, 432 of the conveyor to extend up to twenty feet from its fully retracted position. Pressing and holding IN button 459 causes Section 430, 432 to retract. The ON/OFF button 458 permits the swivel conveyor 400 addressed to be manually powered on or off. This control overrides the PLC, but does not override the individual safety maintenance keylock switches located on drop pits, trench, swivel, or main pits conveyors or control panel. Two limit switches 418 on either side of the conveyor floor track stops movement by removing power from motor 406 if the forty-five degree limit is reached. Likewise two limit switches 419 at both ends of frame 415 limits the extend/retract movement of Section 430, 432. Thus the drop pits operator can move the swivel conveyors 400 to different locations permitting wastepaper to be temporarily stored until needed at the main pit.

In FIG. 4B, the bottom area, 465 of the remote control is for control of the main pit 300, via IR sensor 619 shown on FIG. 6C. It is divided into two identical sections, one for the feeding final sort side (MP2 of FIG. 6A) of the main pit, and one for feeding the presort side MP1. Referring back to FIG. 4B, when Presort section ON/OFF button 466 is pressed conveyor 602/MP1 either starts or stops running depending upon its state at the time. Pressing CW button 467 causes conveyor 602/MP2 to run in a clockwise direction (viewed from drop pits area) delivering paper to the presort incline conveyor 800. Pressing CCW button 468 causes conveyor 602/MP1 to deliver paper to conveyor 604/MP2. The Final Sort section buttons function the same, except paper is delivered to the final sort incline conveyor 702 when CCW is selected, and conveyor 602/MP1 when CW is selected.

The swivel conveyor 400 of FIG. A has a rotation of plus or minus forty-five degrees (swivels) in the direction of arrow SC1, and a reversible motor and rack and pinion extension capability that can extend and retract up to approximately twenty feet from its retracted position in the direction of arrow SC2. By virtue of its infrared remote controlled electrically operated swivel and extension motors 406 swivel conveyor 400 is steerable, and thus it can be repositioned around its floor area 400 as needed. In operation reversible electric motor 406 allows a swivel gear box mechanism 404 to rotate causing section 408 and conveyor section 430 to rotate in the directions of arrow SC1.

The purpose of the swivel conveyor 400 is to bring wastepaper from the three inactive drop pits (not passing through to trench conveyor 120 feeding the sorting machinery) to a temporary storage area on the drop pits area floor 448, until movement into the main pit 300 by a front loader 450 (shown in FIG. 2) as needed.

Referring to FIG. 2, movement of paper into the main pit 300 can be accomplished in four ways/methods:
1. in normal operation, a single drop pit (one of 11–14) is selected by the drop pit operator to be active and its trench conveyor 120 feeds the main pit 300; or
2. two drop pits are active (concurrent final sort and pre-sort operations) and both of their trench conveyors 120 feed the main pit 300; or
3. the front pusher 450 takes paper from floor pile and pushes it into the main pit 300; or
4. one drop pit is active feeding the main pit 300, and the front pusher 450 is pushing paper into the other side of the main pit 300.

Above method 1 can be the usual method of operation, and usually takes place during a day shift when truck deliveries are occurring; unless no paper is being unloaded into the drop pits and the electric eye system powers down the pit and trench conveyors. Above method 3 is second most usual method and occurs regularly on second and third shifts which are usually after the day shift.

If a drop pit has not been selected as "active" by the drop pit operator 211, it is automatically "inactive", and its belt runs clockwise (viewed from the main pit) delivering paper to the swivel conveyor for temporary floor storage. Under normal conditions there are usually three swivel conveyors operating and only one trench conveyor.

Assume when looking at FIG. 3B the illustrated pit is inactive, i.e., conveyor 110 is not moving. When electric eye system 141 and 142 senses paper on belt 110 it powers up and rotates conveyor belt 110 clockwise (CW). At the same time, swivel conveyor 130 is powered up and its three sections belts delivers paper to a floor pile 449, FIG. 2.

Referring to FIG. 4A, up conveyor 402 is approximately a 4 foot wide cleated rubber belt that retrieves wastepaper from lower conveyor 130. Conveyor 130 and conveyor 402 can be one single conveyor. Conveyor 402 is inched at approximately a thirty degree angle and has an overlapping upper end 403 raised above conveyor section 408. Conveyor section 408 consists of a five foot wide belt section. Motor 406 rotates a wheel to move in the direction of arrow SC3 within swivel rack track 405, also allowing for the rotation of swivel bearing 404.

The second section is the fixed portion of the extension, and is the part which is connected to the swivel mechanism base drive motor, 406 via a gear arrangement, and has swivel casters 424, 426, 427, 428 that permit it to rotate ±forty-five degrees to either side of center position.

Fixed extension section 412 is approximately five feet wide to allow for the swivel action along arrow SC1, so no wastepaper from first upper conveyor belt 402, 403 is lost when it is rotated near its maximum position; and allows room below it for the four foot wide Section 430 that extends and retracts along arrow SC2. Wastepaper on upper conveyor belt 408 is squeezed down to an approximately four foot width by restrictor plates 410 for dropping onto a four foot wide conveyor section 430. Conveyor section 430 is electrically extendable (extends and retracts); and includes a flat conveyor belt 409 having a thirty degree cleated incline bend at 432 which raises the wastepaper twenty feet high for piling on the floor, 448. The extension section 430 moves on eccentric rollers 414, 416 which keep on track by respective rails 415, 417 they roll on. Section 430 contains swivel casters 427, 428 that permit the conveyor 400 to be extended/retracted and swiveled, thus permitting repositioning so paper can be piled/spread in the vicinity of the swivel conveyor 400 on floor 448. Deflector plates 434, mounted to the front of the 20 foot high inclined frame 433 prevent paper from getting in the way freedom of movement of casters 427, 428. A conventional safety alarm (not shown) makes a beeping sound upon conveyor 400 movement to alert personnel. The conveyor's sections 402 and 430 which both contain inclines can have two inch cleats on thirty-six inch centers to help paper movement; and are each both four feet wide. Sixteen inch side skirts (not shown) for keeping wastepaper on swivel conveyor 400 run the length of the conveyor. At the start of the day the extension section 430 is fully extended in the direction of arrow SC2. As wastepaper is piled up on the floor 448, the conveyor 400 can be rotated to either side along arrow SC1 and SC3; the conveyor is then retracted some distance and a new/adjacent stack of wastepaper is started on the floor 448, thus permitting more paper to be spread around the floor 448. Remote operation of swivel conveyor 400 can include conventional infrared sensors and electronics 449 to allow for remote operation of the swivel conveyor through the remote control 450 of FIG. 4B. Each swivel conveyor 400 can be operated by the pit operator 211 with a hand-held remote (see FIG. 4B). Remote control is via a wireless hand held remote control similar to that used to operate a television, except it will only operate the swivel conveyor addressed. The remote control can have a section for each conveyor 400, with conventional Left, Right, Out/Extend, In/Retract and On/Off. See buttons 455–460 FIG. 4B. Conventional mechanical switches 418 and 419 can cutoff motor operation if a threshold limit is reached. Front loaders 450 (more clearly shown in FIG. 2 can move piled/stacked wastepaper around that come from swivel conveyor 400.

Figure 5A:
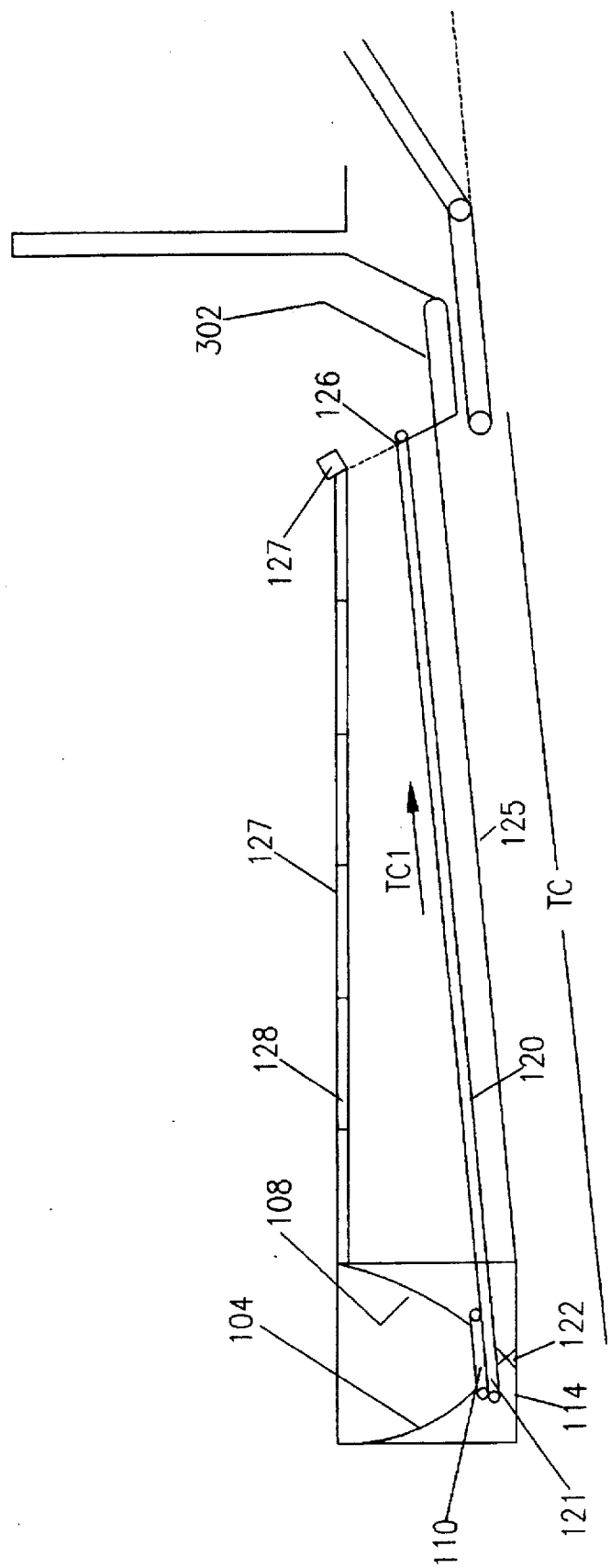
FIG. 5A is a side view of the underground trench conveyor used in the invention of FIG. 2.
Figure 5B:
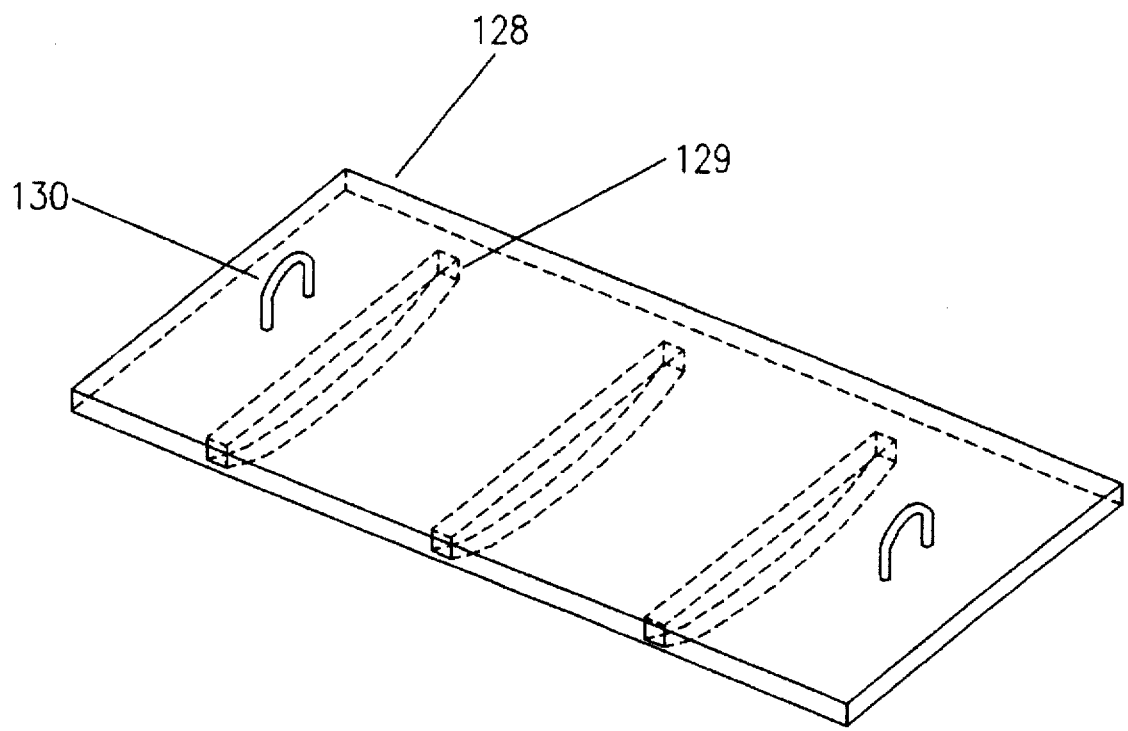
FIG. 5B is a perspective view of a trench cover plated used in FIG. 5A.

FIG. 5A is a side view of the trench conveyor 120 of the invention of FIG. 2. In FIG. 5A, trench conveyor has a rubber belt 120 having length, TC, of approximately fifty feet and runs slanted up to concrete floor 127, and parallel to concrete floor 125. Optionally the belt 120 can include cleats. However, since the incline is spread over a 50 to 60 foot length conveyor cleats are not necessary. Trench conveyor belt 120 receives wastepaper from the reversible belt 110 and passes the wastepaper in the direction of arrow TC1 toward the main pit area 300 (shown in more detail in reference to FIG. 6A). The trench conveyors 120 run similarly from each drop pit 11–14 to the main pit area 300. Like the swivel conveyors 400, each trench conveyor 120 has an originating end 121 located below the end 110 of the reversible conveyor 110. When a drop pit (one of 11–14) is designated as the active pit, (feeding the sorting machinery via the main pit), the reversible conveyor 110 (in FIG. 3A, 3B) rotates counterclockwise when the electric eye beam 141–142 has been interrupted by the presence of paper, WP, and deposits that paper onto the trench conveyor 120 which in turn delivers the paper under the floor 127 FIG. 5A to the main pit 300. The trenches through which the trench conveyors 120 run can be set below floor level 127 during building construction and can be covered by thick removable metal plates (not shown), in order to gain access to the trench. The trench cover plates 128 shown in FIG. 5B can have angled weldments 129 on the underside for increased strength, can have flush lift eye pads 130 and be strong enough to handle the weight of a front loader, 450, and its paper load. The output end 126 of the trench conveyor 130 at the main pit 300 can be mounted with a conventional electric eye 127 (similar to electric eye 141, 142 discussed previously) so that if no paper movement is detected for a selected interval, an audible or lighted alarm (not shown) can sound signifying a problems with the underground trench conveyor 130 such as but not limited to a paper jam and the like.

FIG. 6A is a top view of the main pit 300 of the recycling center 100 of FIG. 2. Main pit 300 is the pit through which all wastepaper passes. Wastepaper is provided to the main pit 300 from three basic sources. Namely: (1) active drop pit trench conveyor 120, (2) sort area to main pit return conveyor 701, (3) from a piled stack of loose wastepaper in the swivel conveyor area 448 which is pushed into the main pit 300 by a front pusher 450.

FIG. 6B is a side view of main pit area 300 of FIG. 6A along arrow V2. FIG. 6C is another top view of main pit area 300 of FIG. 6A in greater detail.

Referring to FIGS. 6A–6C, main pit 300 has a length, MPL, of twenty-six feet and a width, MPW, of eight feet, and a depth, MPD, of five feet. Main pit 300 contains dual five feet wide reversible rubber belt conveyors 602, 604 each running in the directions of arrows MP1 and MP2, respectively. Conveyor 602 is twelve feet long and conveyor 604 is fourteen feet long to accommodate return to main pit conveyor 701 into additional trench conveyors 120 from drop pits 11 and 12.

Referring to FIGS. 6A–6D, the conveyors 602, 604 run the length of the main pit 300, and have height bars 620, pit plates 609, 610, exit openings beneath height bars 620 for the trench conveyors 120. The conveyors 602, 604 further have an electric eye system pit 613 and 614 power standby units. Water drains 605 are located in each pit to remove rain or cleaning water. A floor hatch 611 and stairs 612 provide entrance below the floor 616 to a lighted 615 pit for maintenance or cleaning. The front pusher 450 can lead the main pit 300 from three sides. The side furthest from the drop pits 10 is next to the wall 302 that separates the drop pit area 10 from the operations area 600. A sliding door 303, shown in FIG. 2 between the drop pits area 10, and the operations area 600 permits short/undersized bales made at grade changes to be returned to the main pit 300.

Referring to FIG. 6B and 6C, the main pit plates 605, 607, 609, 610 function and are constructed much like the drop pit plates. The major difference is the pit plates on the side nearest the drop pits 605 contain openings for the exit 606 of four or five trench conveyors paper. The side plate 607 closest to the wall contains an opening 608 for the return to the main pit conveyor. Like described for the drop pit plates (refer to 104 FIG. 3C), they are fifty-five degree angled steel plates, vibration isolator mounted, contain shaker motors with concentric weights, and an electric eye control system to power off when no paper is on the conveyors belts. The side plates 605 and 607 extend down to within two inches of the belt. The end plates 609 and 610 extend from the top of the main pit to within one inch of the conveyor and contain a three foot opening to allow paper to pass to the presort or final sort conveyors at each end. The major portion of the plates weight is supported by the bottom frame channel so the vibration isolators do not deteriorate. The main pit plates do not have arched steel bars across the pit like the drop pits because the amount of wastepaper entering is more controlled.

Referring to FIGS. 6A–6C, the purpose of dual reversible conveyors 602 and 604 is to permit two simultaneous sorting operations, a presort and final sort, or at other times, a single final sorting operation. Some wastepaper is best if presorted prior to going to the final grade sort machinery and usually would be old corrugated cardboard (OCC) which is mixed with other paper.

Simultaneous sorting always involves corrugated cardboard (OCC) and some other grade(s) such as boxboard or carton board. As shown in FIGS. 6A–6C, the main pit conveyor is split into two conveyors MP1 and MP2, 602 and 604, respectively. This permits simultaneous sorting to take place as follows. The drop pits area operator 211 using the hand held remote control (FIG. 4B) points at the main pit IR sensor 619 and commands conveyor MP2, 604 with the ON button 468 to run counter clockwise (viewed from drop its area) delivering paper from either drop pits 1 or 2 (FIG. 2, 11 or 12) or the front pusher 450 loads to MP2 to be sent to the final sort incline conveyor 702.

Figure 7A:
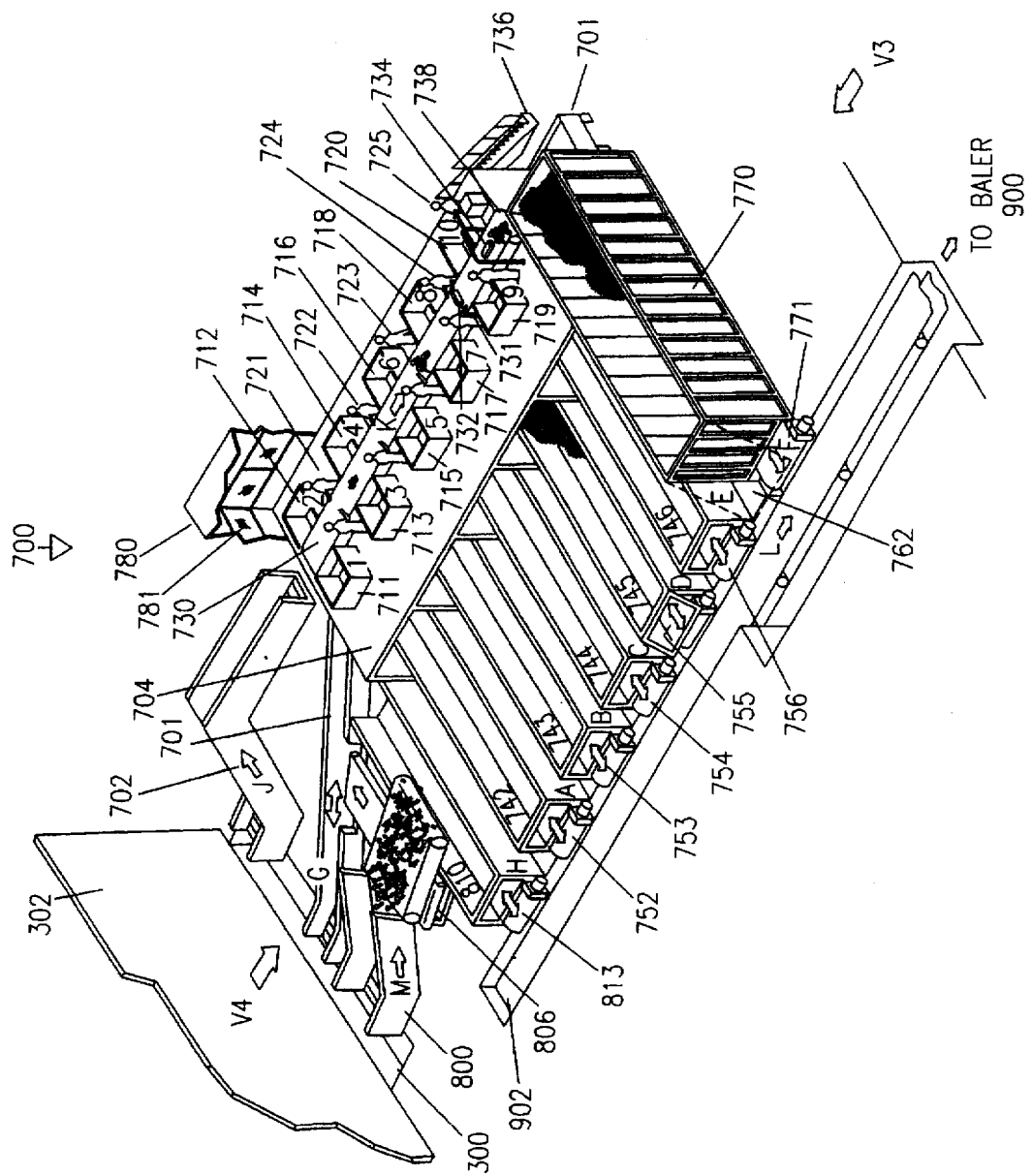
FIG. 7A is a perspective view of the final sort machinery of the recycling center invention of FIG. 2.
Figure 7B:
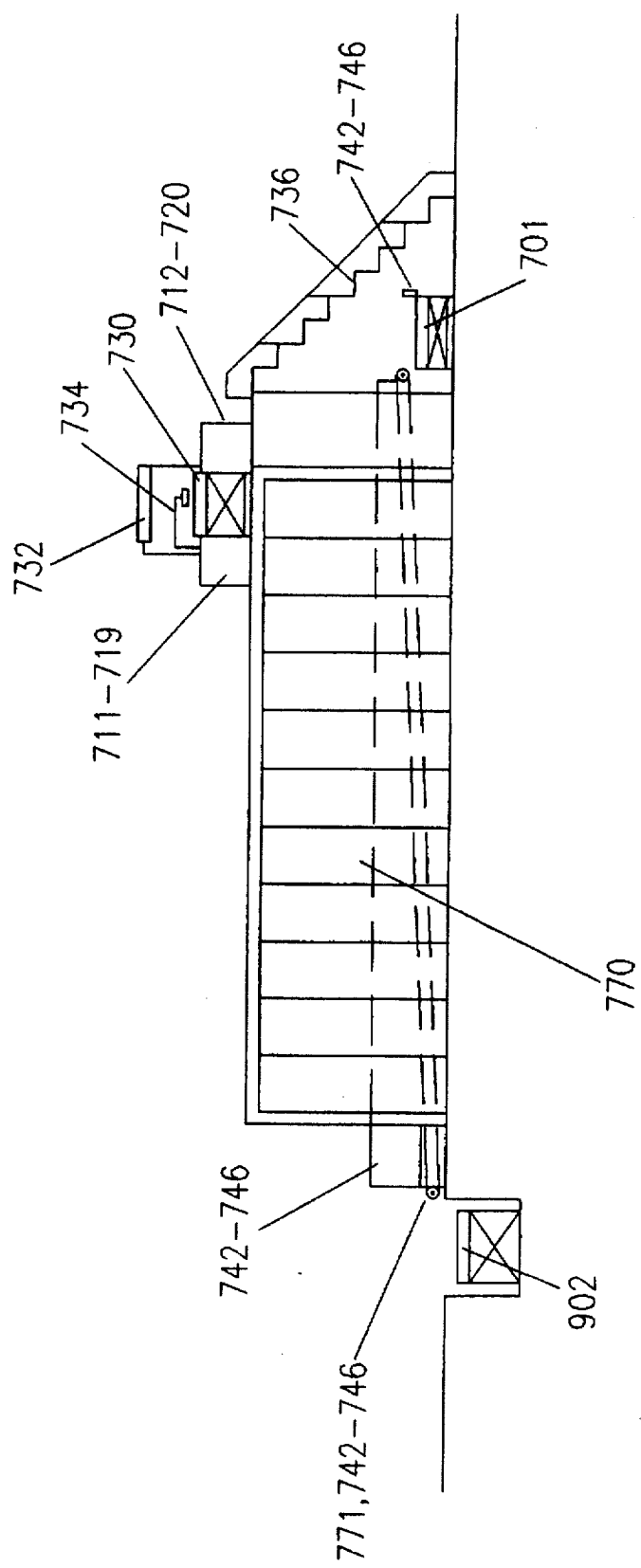
FIG. 7B is a side view of the final sort machinery of FIG. 7A along arrow V3.
Figure 7C:
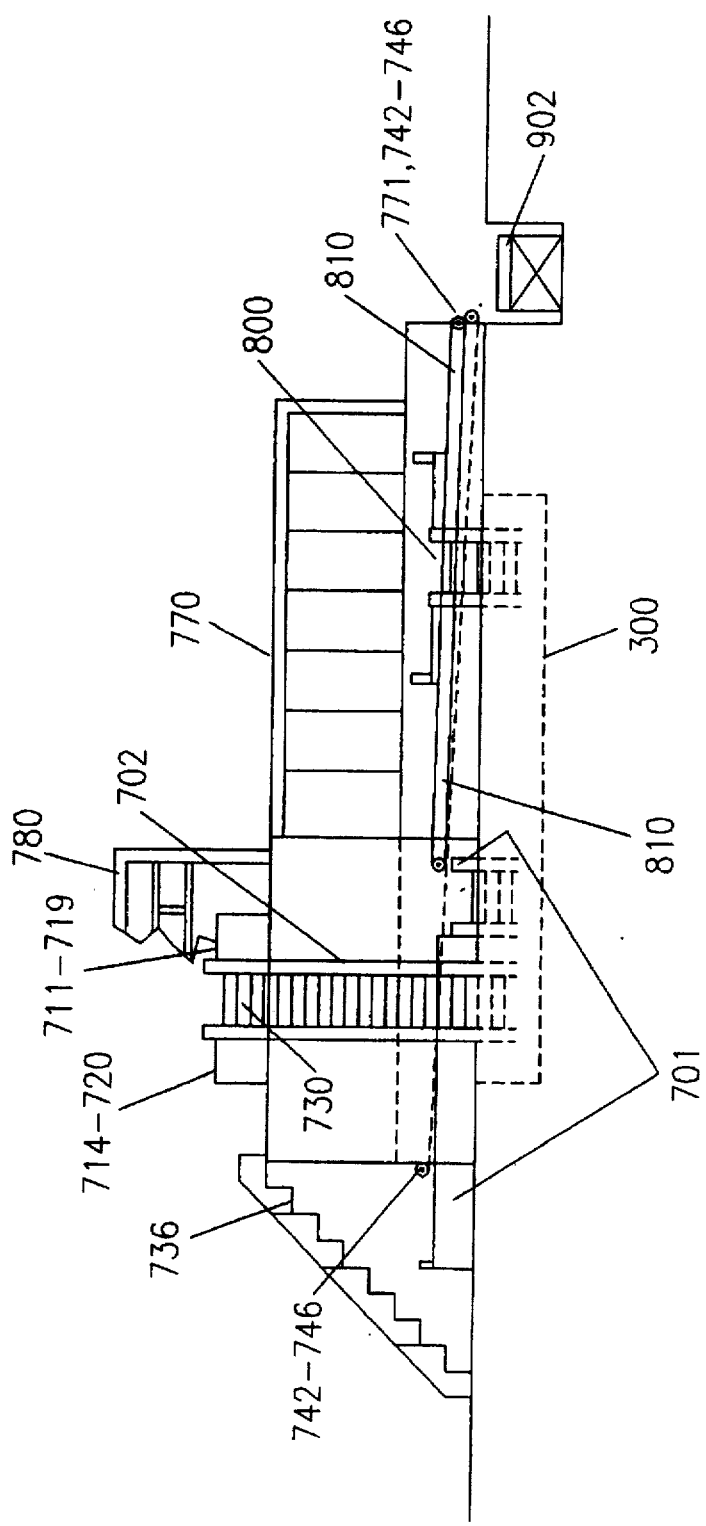
FIG. 7C is a side view of the final sort machinery of FIG. 7A along arrow V4.

Referring to FIG. 7A, final sort incline conveyor 702 delivers paper to sort platform conveyor 730 where final sorting takes place by the sorts (721–725 and five on the opposite side) positioned along both sides of the conveyor belt 730. Sorters 721–725 remove the unwanted grades from conveyor 730 and place in assigned drop chutes 711–720 for temporary storage on drop chute conveyors 742–746. The desired grade 738 is permitted to continue along the length of the belt in the direction of arrow K and is deposited in bin 770 containing conveyor 771. FIG. 7B is a view of FIG. 7A along arrow V3, and FIG. 7C is another view of FIG. 7A along arrow V4.

To commence simultaneous sorting, the drop pits operator 211 swings hinged steel separator plate 603, FIG. 6B and 6C, into locking latch 621. Plate 603 contains plastic bottom straps 622 which keeps paper groups coming to the main pit from getting mixed and onto the wrong main pit conveyor 602 or 604. Conveyor MP1, 602 is commanded by the hand held remote control pointed at IR sensor 619, to run in a clockwise direction (viewed from drop its area) which delivers paper to presort machinery conveyor 800. We now can have mixed cardboard delivered from drop pit 3 or 4 (FIG. 2, 13 or 14) removed from a floor pile 449 and placed into the main pit 300 by the front pusher 450.

Large OCC mixed with smaller boxboard, carton board, paper, magazines, or other grades is brought by presort conveyor 800 to FIG. 8A presort (Star-screen) machinery. As the OCC/mixed paper is fed across the rotating star wheels 802, the smaller pieces of carton/boxboard or paper falls through openings 812. They are carried by bottom conveyor 806 (shown more clearly in FIG. 8B) to return to main pit conveyor 701, and back to the main pit 300 (see FIG. 6A). At the main pit they are deposited on MP2 conveyor 604 for delivery to the final sort incline conveyor 702, and final sorting as previously described.

Meanwhile, the larger OCC not separated from the mixed paper continues across star wheels 802 and is deposited on reversible presort end conveyor 810 which is set to deliver paper to baler conveyor as shown at 902, FIG. 7A. In the manner described, simultaneous presorting and baling of corrugated cardboard (OCC) is accomplished via the presort star-screen machinery 800, while another grade of paper is final sorted and held in bin/conveyor 770, 771 until the baler is free from making OCC bales.

The dual conveyors 602, 604 are unequal in length, running the full length of the pit, and are separated by about one inch at the ends of each conveyor where they meet. The conveyor 604 on the pit 300 side containing the sort area to main pit return conveyor 701 (see FIG. 7A). The left side viewed from drop its area (11–14) is two feet longer than the other side. If both conveyors 602 and 604 are set to run counter clockwise (when viewed from the drop pits area) all paper coming into the pit 300 is delivered via inclined conveyor 702 directly to the final sort machinery. If both conveyors 602/604 are set to run clockwise, all paper coming into the pit 300 is delivered via inclined conveyor 800 to the presort machinery.

Wall 302 separates the main pit 300 from the presort 800 and final sort operations area 700. The Final Sort Machinery of FIG. 7A is distributed by the Van Dyk Baler Corp. of Stamford, Conn. and includes an imported Bollegraaf Sorting system that has been substantially modified here.

Referring to FIG. 7A, when it is desired to perform concurrent presort and final sorting, the main pit conveyor 602 feeding the presort inclined conveyor 800 is set to run clockwise, while the pit conveyor 604 feeding the final sort inclined conveyor 702 is set to run counter clockwise. In this condition, any paper brought from the number 3 or 4 drop pits via the trench conveyors 120 or pushed into the main pit 300 on that side by the front pusher 450 is delivered to the presort inclined conveyor, 800. Likewise, any paper coming from drop pits 1 or 2 via the trench conveyors 120 or pushed into the opposite side of the main pit 300 is delivered via the inclined conveyor 702 to the final sort machinery platform conveyor 730.

Referring to FIG. 6B and 6C, hinged pit separator steel plate 603 can be rotated into position between conveyors 602 and 604 during concurrent sort operations to keep papers pushed into the main pit 300 by the front pusher 450 from getting onto the wrong conveyor belt. Latch 621 keeps the plate 603 locked into position. Plastic straps 622 extend into main pit.

Figure 6D:
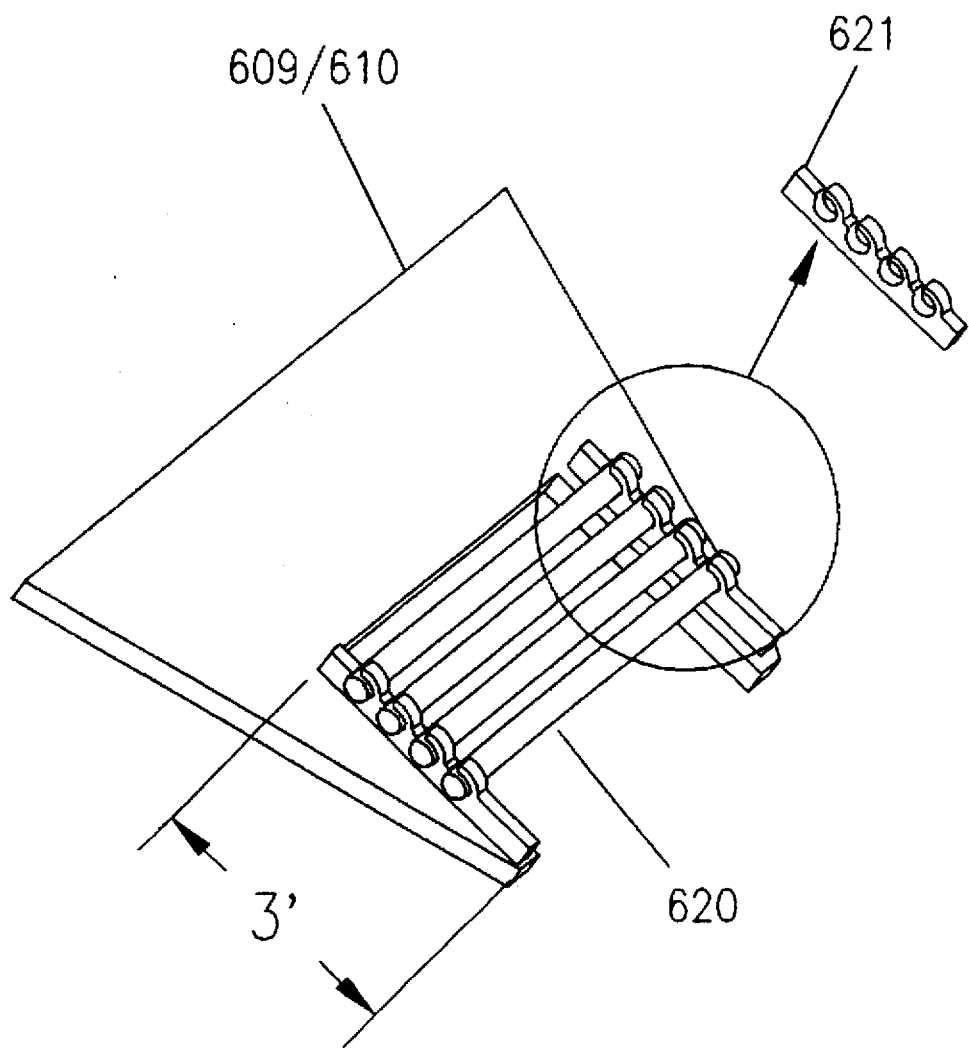
FIG. 6D is a perspective view of the main pit height bars of FIGS. 6A–6C.

Referring to FIG. 6B and 6C, at the end of each main pit conveyor located on the end plates 609, 610, there are several operator adjustable bars 620 which are set to a height by openings in rack 621 that limits the depth of the paper that feeds to the final sort or presort machinery conveyors 800 and 702. FIG. 6D shows a perspective view of the height bars 620. For example, the front loader pusher 450 (in FIG. 2) may empty a load into the pit 300 that is four feet high. This could cause the depth on the final sort conveyor 720 to be so high it might effect a quality sort; so the bars skim off the top two feet, reducing the stack from four to two feet, or as set by the floor manager discussed previously.

Referring to FIG. 2, the operations area 600 is comprised of the presort machinery 800, final sort machinery 700, a horizontal baler 900, a programmable load controller 1100 (PLC), and the loading/shipping area, 1000. The selection of the presort and final sort machinery combination is one of the major reasons this system is unique. It integrates and modifies machinery 800 not generally used for multi-grade quality sorting.

Referring to FIG. 2, the inclined conveyor, 702 feeding the final sorting machinery platform 704 exits the floor near the wall 302 that separates the main pit 300 from the operations area 600. The conveyor 702 can be a standard four foot wide variable speed belt with raised cleats running the width of the belt to provide grip, and side skirts to prevent paper loss.

The final sort machinery 700 shown more clearly in FIGS. 7A–7C is a single-line, state-of-the-art, high reliability, variable speed, multi-belt (drop chute conveyors) sorting machine. The final sort machinery can be modular in design, and is a ten station configuration custom built to our specifications. Wastepaper passing through the final sort machinery 700 is either delivered to the conveyor/bin 770 for later or current delivery to baler 900, or returned back to the main pit 300 for reprocessing by drop chute conveyors 742–746 and return to main pit conveyor 701. The variable speed and multi-belt speed features perform dual functions. First the multi-belt speed feature decreases the depth of the wastepaper by spreading it as it passes through the system. This is accomplished by increasing the speed of each successive conveyor.

An example will now be described in reference to FIGS. 7A–7C, along with FIG. 2. If for example, the main pit conveyor 604 is operating at twenty-five feet a minute the paper may be two feet high, as it is placed on the inclined conveyor 702 operating at fifty feet per minute it is deceased to one foot high; when placed on the final sort belt 730 operating at one hundred feet per minute, it spreads to six inches high. The variable speed feature permits the floor manager to adjust the final sort conveyor 730 to the optimum speed to ensure a quality sort and to meet the fifteen ton per hour minimum needed to output three hundred tons per day. The machinery receives its input directly from the main pit 300, from the presort machinery, or both at the same time. The desired active paper passes along the final sort machinery conveyor 730 (K) to the large end bin conveyor 770, 771 (F) for continuous delivery to the baler 900. The grades of paper not being bailed at that time are removed by sorters 721–725 from the conveyor and dropped into chutes to conveyors 742–746 below the sort platform 704; a conveyor is assigned for each respective paper grade. Waste from the post consumer source such as plastic bags, plastic milk containers, soda cans, food soiled paper, etc., which mistakenly find their way into the wastepaper recycle bins are removed and placed in wheeled bins (not shown) at each sort station. At the days end, waste is emptied down a drop chute 711–719 to one of conveyors 742–746 (A–E) and delivered to conveyor 701 and at bin 770 (G) to wheeled bins for removal from the center. Wastepaper sorted from the active platform conveyor 730 (K) and stored on the conveyors 742–746 below platform 704 can either be moved directly to the baler conveyor 902 (L) if not contaminated during the sort by various grades, or can be conveyed back to the main pit 300 by the return conveyor 701 (G) for resort. A typical existing single-line configuration will sort 20 tons per hour of mainly one grade (for example ONP) utilizing six sorters. Our single-line sorting system has 10 sorter stations to process 15 tons per hour and ensuring a high quality multigrade sort. This staffing may be a conservatively high figure, and possibly could be reduced as experience dictates; however, to ensure high quality, one station contains x-ray equipment which will be described later. For paper input, paper is lifted by an inclined conveyor 702 to the horizontally positioned final sort platform conveyor 730 (K).

Entry to the final sort machinery by the 10 sorters is accessible via a stairway 736, shown in FIG. 7A. An optional sorter comfort module 780 may be installed as later described, or the human sorters stand on the platform 704 protected by a railing (not shown). As shown in FIG. 7A, there are five sort stations 721–725 on each side of the platform conveyor 730 (K), each containing a drop chute opening 711–720. The stations are numbered from 1 to 10 starting at the input side of the conveyor 730, with odd numbered on one side and even numbered on the opposite side. To prevent fatigue each sort station can have a stool (not shown) so the human sorter can stand or sit as needed. Sorters 1 through 8 (721–724) are positioned between two drop chutes. Positions 9 and 10, 725, have access to only one drop chute; but these two stations perform dual duties. Each drop chute 711–720 leads to a standby drop conveyors (742–746) identified as (A thru E), with the active bin/conveyor 770/771 at the end of the belt being identified as conveyor 771 (F). Sorter operational experience will early on suggest that the grades most commonly mixed with the active grade will be assigned to standby drop conveyors 743–745 (B) through (D). Drop conveyor 742 (A) will always be assigned to the grade least expected because there are only two sorter chances (drop chutes 711, 712, 1 and 2) to remove it from the belt. Conveyors 743–745 (B) through (D) would be assigned to the grades most likely expected to be mixed with the active grade, because each has four sorter chances/chutes to remove it from the belt.

For example, assume a communities residential curbside recycle program collects new paper ONP, magazines (OMG), MOW, and household corrugated cardboard/box board (C/BB) in the same recycle bin. If ONP is the active grade sort going to the baler, Conveyor 742 (A) likely would be assigned to C/BB (least amount expected from a household), 743 (B) to magazines, 744 (C) to white MOW, 745 (D) to color MOW, and 746 (E) to all other grades.

Referring to FIGS. 7A–7C, sort stations 721–724, 1 through 8 are those having the least specialized dudes. Number 1 and 2, 721 are the first stations at the front of the sort platform conveyor 720 where the wastepaper is deposited from the main pit inclined conveyor 702; stations 3 through 10 are numbered in sequence as the paper proceeds across the sort platform. Each station is assigned a responsibility to remove a particular grade(s) of paper from conveyor 730 and deposit it in their respective drop chute 711–720. In this manner, at the end of the sort platform conveyor only the active grade wastepaper remains and it is deposited into the active bin/conveyor 770/771 (F) for forwarding to the baler 900.

Referring to FIGS. 7A–7C, the wastepaper dropped into the numbered sort station drop chutes is collected on its respective standby conveyor, 742–746 (A/E), and as it builds up it can either be returned to the main pit 300 via the return conveyor 701 (G) when that particular paper is the active grade paper, or held on the conveyors 742–746 for temporary storage until needed to be fed to the baler. If it becomes necessary to mix more than one grade on a drop chute standby conveyor 742–746 (A–E) due to a load not properly sorted, the paper would be routed via the return conveyor 701 back to the main pit 300 for a second pass and sorting prior to going to the baler 900. As the sort crew gains experience it will become a routine procedure when they must mix grades at their drop chutes to keep unwanted grades from reaching the active bin/conveyor 770/771 (F).

Standby drop chute conveyors 742–746 (A–E) have electrically operated top hinged gates 752–756 on both ends which permit greater amounts of paper to be collected prior to sending it to either the baler or returning it to the main pit. When a gate 752–756 is closed, the conveyor belt control switch can be "toggled" to move the conveyor 842–746 a short distance and thus store additional paper as it builds up under the drop chute 711–720. When a gate 742–746 is opened, the paper can be moved to conveyor 701 (G) for return to the main pit 300, or to conveyor 902 (L) for movement to the baler 900.

Referring to FIGS. 7A–7C, Sort station 9, 725 (opposite side) has dual duties and therefore only has one drop chute

719. The first duty is to remove from the belt whatever grade of paper is assigned to conveyor 746 (E). The second duty of station 9 is to position the removable electromechanical swing gate mechanism 734 into the center of, and above the belt 730 when not sorting OCC or any paper containing fasteners. This position also monitors the X-ray screen display 739 for paper debris not visible to the sorters' eye.

Referring to FIGS. 7A–7C, sort station 10, 725 also has dual duties, having only one drop chute 720. The primary duty is to remove any paper having a fastener not detected by the X-ray scanner 732 (such as a General Binder Co. (GBC) plastic comb binder), food waste, dirty paper, and any other grade of paper that has traveled the length of the belt excepting the active grade. Station 10 is the final authority and is assigned quality control. Secondary duty is to remove whatever paper grade has been assigned to conveyor 746 (E) or not the active bin/conveyor 770, 771 (F). The X-ray system can be model Line SCAN 215, P/N Sys 215 manufactured by EG&G Astrophysics Research Corp., Norcross, Ga. that has been modified for our use.

As shown in FIGS. 7A–7C, active bin/conveyor 770/771 (F) is the largest, because it is the baler 900 feeder. Its bin gate 762 can be left open and its contents continuously feed the baler, or left closed until a predetermined level is obtained at which time the bin gate can be electrically opened to feed the baler 900.

Referring to FIGS. 7A–7C, standby drop chute conveyors 842–846 (A/E) are reversible conveyors, having three functions: (1) without conveyor movement, they become temporary drop storage, (2) with movement in the direction of the baler conveyor 902 (L), without opening the gate, they can temporarily store larger amounts of paper, (3) with conveyor movement in the direction of the return to main pit conveyor (G), they move the stored paper back to the main pit 300 for resorting. Referring to FIG. 7B, at baler conveyor 902 end poof standby conveyors 742–746, are at floor level and drop paper on 902 which is below floor level. They slant up as they terminate at return to main pit conveyor 701 which is above floor level.

Referring to FIGS. 7A–7C, the reversible return to main pit conveyor's 701 primary function is to return paper to the main pit 300. Its secondary function, when motion is reversed, is to move waste which is not to be baled, but which is located on drop chute conveyors 742–746 (A–E) to the end of the conveyor opposite the main pit for removal from the center, and be landfilled.

The final sort station just prior to entry into the end of the line bin contains an X-ray scanner (see FIG. 7A, 732/739), similar to those found at airports that are used to scan luggage. The x-ray scanner consists of the scanner 732, monitor display 739 and a dual electromechanical gate mechanism 734 which is positioned at the center of the conveyor belt, and splits the belt into two halves, but is approximately ¾ inches above it. The scanner will only be operated when processing high grade papers such as MOW or computer printout (CPO) paper that have a good chance of containing metal. It will be hinged to swing into place when needed. The X-ray scanner 732 will scan the entire width of the conveyor belt examining all paper passing beneath the scanner. The scanner is adjustable for any desired density sensitivity setting which can account for various depths of paper, and types of debris. If any plastic debris or metal such as a fastener, screw posts, paper clip, etc., is detected it will sound an audible alarm and be visible on a monitor display 739 screen. If in the automatic mode, it will operate the hinged swing gates 734 and eject the paper from the conveyor 720 into a wheeled bin. If operating in the manual mode, the sorter steps on a foot pedal which activates a hinged swing gates 734 which ejects the metal/plastic bearing paper off the conveyor 720 and into a bin for debris removal at a later time.

Paper not ejected from the final sort line platform conveyor 720 (K) is delivered to the end bin 770 which has an active conveyor 771 (F) which in turn delivers the paper to the baler conveyor 902 (L).

Presort inclined conveyor 800 (M) feeding the presort machinery (see FIGS. 2 and 7A) is very similar to the final sort inclined conveyor 702 (J) except it is shorter in length and does not elevate the paper as high. It exits the floor near the wall 302 that separates the main pit 300 from the operations area 600. The conveyor 600 also is a standard four foot wide variable speed belt with raised cleats running the width of the belt to provide paper grip, and side walls to prevent loss of wastepaper.

FIG. 8A is a perspective view of the presort-star screen machinery used in the invention of FIG. 2. FIG. 8B is an end view from main pit area. Note: some covers and side skirts/walls are removed for clarity. The primary purpose of the presort star-screen machinery is to separate smaller sized wastepaper grades from the normally larger sized corrugated cardboard (OCC). The star-screen machinery was developed in Europe for the primary purpose of screening bulk construction materials (rock, peat, compost, etc.). The presort machinery is distributed in the U.S. by the Van Dyk Baler Corp. of Stamford, Conn. The presort star-screen machine is custom made for each installation by the machine Fabriek Lubobv Company of the Netherlands.

Referring to FIGS. 8A and 8B, the Presort Star-Screen Machinery that has been substantially modified to collect the wastepaper that is screened separated) from the OCC, will deliver it back to the main pit 300 via bottom conveyor(s) 806 (I) and return to main pit conveyor 701 (see FIG. 7A, G) for further sorting. It is operator optional whether the OCC is delivered directly to the baler conveyor FIG. 7, 902 (L) by end conveyor 810 (see FIG. 7A, H), or sent to the final sort machinery 700 via the return to main pit return conveyor 701. The presort machinery 800 (see FIG. 8A) is approximately ten feet wide by twenty-four feet long. It consists of a series of three rows of inter-meshing star-burst wheels 802 and an operator variable opening 812 of approximately twelve to eighteen inches between the next series of rows. The rows and openings extend across the entire length of the presort machinery. The star wheels 802 are made of hardened metal, and are vertically positioned, high speed clockwise rotating (in the direction of wastepaper travel) starburst shaped wheels about the size of a media car tire. They pass the larger corrugated cardboard pieces across the top of the wheels PS4 to PS5 to the end conveyor 810 (H) for delivery to either the final sort machinery via conveyor 701 or to the baler 900. The pieces of wastepaper mixed with the OCC being smaller are vibrated free from the OCC and fall through the openings 812 between the group of three of rows of rotating star wheels 802. They drop onto bottom conveyor (s) 806 (I) for delivery via the return to main pit conveyor 701 (G) for further sorting. This will be the first recycle center system to have both the presort and final sort machinery combined into a system which bales all grades that are processed. The distance of the openings 812 between rows of star wheels 802 is adjustable, which we believe may permit the separation of other mixed grades of paper. For example, mixed office waste (MOW) from ONP, or boxboard from old magazines (OMG); this remains to be tested. The presort machinery provides a valuable purpose even if it can only sort paper from OCC.

Referring to FIGS. 8A and 8B, the presort machinery end conveyor 810 (H) is reversible, and feeds either the baler 900 or the return to main pit conveyor 701 (G).

The operations area will now be discussed in reference to FIG. 7A. The direction of travel of all seven reversible (701, 742-746, 801) operations area conveyors is controlled from a control panel FIG. 7A, 781 located in the comfort module 780. Each conveyor has a five position switch and a key lock, see FIG. 7D and 7A. Table 1 lists all conveyors in the operations area by name and alpha designation, it also indicates if it is reversible, and if it has an electrically operated gate mechanism.

Figure 7D:
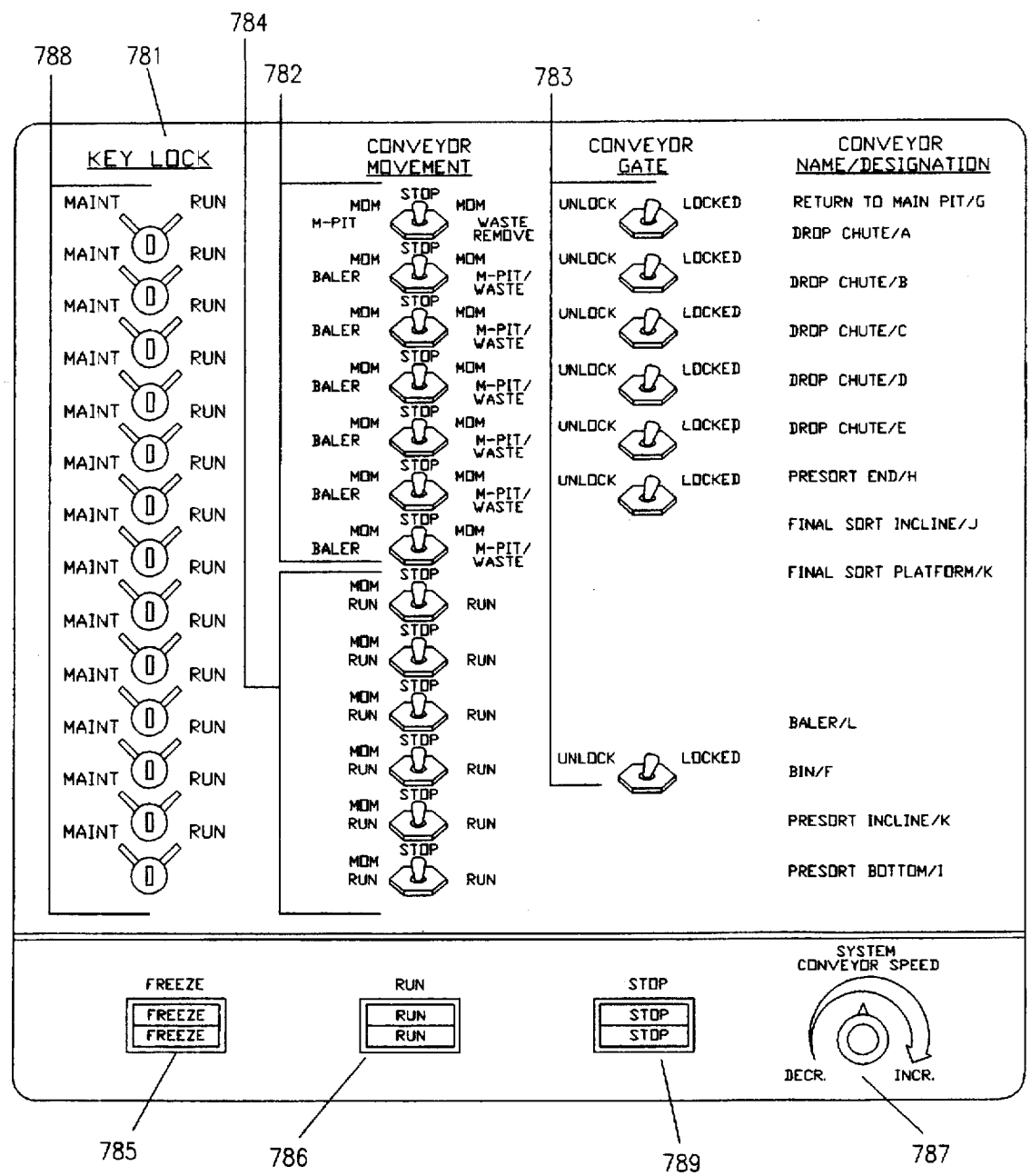
FIG. 7D is a perspective view of the operations area conveyors control panel.

Referring to FIG. 7D, there is one key lock switch 788 for each conveyor; it is a two position switch, marked MAINT and RUN. Both the maintenance person and the floor manager can have keys. When in the MAINT position, it prevents anyone from accidently moving a conveyor while maintenance is being performed. When in the normal RUN position conveyor movement is controlled from its associated conveyor control panel switches.

TABLE 1

CONVEYOR CONTROL PANEL SWITCHES
OPERATIONS AREA CONVEYORS TYPES

REVERSIBLE CONVEYORS

| | |
|---|---|
| 701 | Return to Main Pit-G |
| 742 | Drop Chute-A |
| 743 | Drop Chute-B |
| 744 | Drop Chute-C |
| 745 | Drop Chute-D |
| 746 | Drop Chute-E |
| 810 | Presort End-H |

NON-REVERSIBLE CONVEYORS

| | |
|---|---|
| 702 | Final sort Incline-J |
| 730 | Final Sort Platform-K |
| 902 | Baler-L |
| 771 | Bin Conveyor-F |
| 800 | Presort Incline-M |
| 806 | Presort Bottom-I |

CONVEYORS WITH A GATE

| | |
|---|---|
| 742 | Drop Chute-A |
| 743 | Drop Chute-B |
| 744 | Drop Chute-C |
| 745 | Drop Chute-D |
| 746 | Drop Chute-E |
| 771 | Bin Conveyor-F |
| 810 | Presort End-H |

As previously described and shown by flow direction arrows on FIG. 7A some operations area conveyors only have one direction of travel while others are reversible. In summary, all standby drop chute conveyors 742-746 located below the sorting stations, the sort return to main pit conveyor 701 (G), and the presort machine end conveyor 810 (H) are reversible conveyors. The remaining conveyors 702, 730, 902, 771, 800 and 806 (F, I, J, K, L and M) are unidirectional. The five position toggle switches, one for each conveyor function as follows: In the center STOP position power is removed and no movement can take place.

The switches of FIG. 7D control the conveyors as labelled in the far right column of the diagram. Referring to FIG. 7D, when the spring loaded switch 782 is held to the left side of the STOP position, marked MOM (location marked), the spring loaded switch must be held to operate the conveyor in a CW direction. When placed in the extreme left position marked (location marked, i.e. main pit baler, etc.) the conveyor continuously runs in a CW direction without being held. When the spring loaded switch is held to the right side of the STOP position, marked MOM (location marked, i.e. main pit, baler, etc.), the spring loaded switch must be held to operate the conveyor in a CCW direction.

When placed in the extreme right position marked (location marked) the conveyor runs continuously in a CCW direction without being held.

Non-reversible conveyors controls switches 784 are only three positions, STOP, spring loaded MOM (momentary) RUN, and continuous RUN.

The drop pits and swivel conveyors continue in an active mode during FREEZE condition so truck deliveries can be made to the center; however all drop pit conveyors rotate CCW and deliver paper to the swivel conveyor 130 during this mode. All other center conveyors are sequentially stopped.

When depressed, the white illuminated segment of push button 785 marked FREEZE causes the PLC to sequentially stop most conveyors (except the drop pits and swivel conveyors) and the baler, changes color from white to yellow, and extinguishes the green segment of the RUN push button or red segment of STOP. The FREEZE push button 785 is used at break time, lunch, and shift change. Unlike the action of the large mushroom type FIG. 9 EMERGENCY POWER OFF (EPO) buttons at various locations around the center which removes power from all conveyors, machinery and baler, this push button merely stops all conveyors and star screen motors. Baling compression if in progress continues, and ejects the bale, the baler then goes into a standby mode.

When depressed, the white illuminated segment of push button 786 marked RUN changes color to green See FIG. 7D. It causes all recycle center conveyors and the baler to return to the exact condition they were in prior to the Freeze; and start conveyors movement or they go into standby mode if the electric eye circuit does not sense presence of paper. It also changes the FREEZE button 785 color from yellow to white or stop button 789 from red to white. The STOP push button 789 top white segment changes bottom segment to red, and causes all equipment and machinery (including the drop pits and swivel conveyors) to sequentially stop and power down. It also changes green RUN or yellow FREEZE to white.

The control marked system CONVEYOR SPEED 787 is a rotating control which sets the speed of the final sort machinery platform conveyor (K) and all other variable speed conveyors. A center indent position is normal position and the conveyors operate at a speed which delivers at least fifteen tons per hour. The final sort conveyor 730 is variable between thirty to one hundred twenty feet per minute. This single control sets the speed of all recycle center conveyors as a system. Individual speed controls for each conveyor are also provided, they are set during system installation at the PLC FIG. 2, 15 and thereafter it should only be necessary to adjust the system conveyor speed control.

Referring to FIG. 7D, a two position toggle switch 783 is provided for each conveyor having a gate. Right position is marked LOCKED. Left position is UNLOCK, which unlatches a gate, 752-756, 762, 813 so paper can be sent to the baler conveyor 902 is depressed. The STOP push button 789 top white segment changes button segment to red, and causes all equipment and machinery (including the drop pits and swivel conveyors) to sequentially stop and power down. It also changes green RUN or yellow FREEZE to white.

In addition to functional switch descriptions such as drop chute A, a diagram of the conveyors identified with alphabet letters can optional be included to index the switches to assist in selecting the proper switch and position.

As shown in FIG. 7A, a prefab comfort module 780 mounted to the sorter platform 704 provides environmental comfort to the sorters which in turn increases worker efficiency. Prefab comfort module 780 can be be air-conditioned, heated, fan vented, provide sound reduction, rest rooms, and have music to reduce the monotony of the job. A supply of gloves will be stored here for employee hand protection. In states permitting smoking at the workplace, the module can be divided with moveable partitions for that purpose. Comfort module 780 can contain a public address system that will announce any changes of active sort, reassignments of drop chute conveyors 742–748 (A–E) based on an assessment of the wastepaper to be supplied to the main pit 300. The pits operator 211 or floor manager 213 (FIG. 2) can make announcements.

Referring to FIG. 2, the horizontal baler, 900 is a top of the line model manufactured by Bollgraff, Model HBC-110F, distributed by Van Dyk Corp. of Stamford, Conn., which is fully automatic and requires no operator. The baler can contain a ruffler and a pre-press flap (not shown) which makes it possible to square corner a bale of unshredded paper without a cutting system. Also, the conveyor 902 loads a second load onto the pre-press flap while the main ram is pressing. These features prevent jamming because of no fixed bale chamber design; also, there is no shearing because of the pre-press flap system. The baler 900 is rated the most energy efficient and fastest on the market, and can produce programmable size bales, under worst case conditions, at the rate of one every 2.5 minutes (24 per hour). The programmable size feature permits the bale to be sized for maximum efficiency of stacking within the trailer or rail car. The finished bales can be tied with up to five horizontal and vertical wires, selectable as part of the program, thus ensuring integrity of the bale during center and in route movement. Lastly, because of its no fixed chamber design, bales can be as short or as long as wanted (what ever is in the feeder), thus permitting changing of grades very easily without removal of a short bale.

Referring to FIG. 2, the PLC 1100 sequences the starting and stopping of major recycle center electrical loads, mainly motors. The motors ratings range from 50 HP down to 2 HP. The numerous conveyors and baler starting at one time would create a current overload, so the PLC sequences their starting by controlling the solid state design motor controllers. The PLC is keypad programmed utilizing a built-in terminal display. Upon power on, the equipment and machinery is powered opposite the flow of paper, i.e., from the baler to the drop pits. This prevents paper being feed to a conveyor that is not active and running. Likewise during a power off, the power sequence is with the flow of paper; thus the drop pits conveyors power are removed first, then the trench conveyors, then the swivel conveyors, till lastly the baler is powered off.

The loading area will now be described in reference to FIG. 2. As the bales exit the baler 900, a forklift operator using a side clamping lift 1000, places the bale either on a storage stack, on a track trailer 40, or railroad car 40, for transportation. The loading area is sufficient in size to permit some temporary storage if desired. Conventional ceiling mounted exhaust fans (not shown) can remove the forklift 1000 propane exhaust fumes.

The center provides loading docks for up to ten forty foot trailers, and parking space for up to twelve tractor trailers if no rail siding is available PS shown at 40, FIG. 2. The loading dock area can contain a building overhang (not shown) to prevent weather interference with the loading operations. The truck parking area can be constructed of thick asphalt to accommodate the loaded trucks, with the loading dock area being constructed of full size concrete pads. The trailers which have been loaded and moved from the docks can be able to place their landing gear on concrete pads if not connected to a tractor, to prevent asphalt indentation during hot weather.

A novel wastepaper recycle center 100 of FIG. 2 can be located on approximately 2.5 to 3 acres of land. A cyclone fence 1600 encloses the grounds, with electrically operated gates 202, 1650 providing entrance to the grounds at the guard house. The center most likely will be in an industrial/manufacturing area that has exiting water, sewer, electrical service, and paved roads. The center building can include a prefabricated steel building purchased from Heritage Building systems, Inc. of North Little Rock, Ark. of approximately 50,000 square feet in size, with a twenty-four foot height, erected on a poured concrete foundation/floor which is elevated to allow for track and railroad traffic. The floors/foundations described in this description is for construction in climates where frost footings are not required. The cost of a foundation in cold climates would have to be increased for that additional construction. The building can be surrounded on two sides by employee and tractor trailer parking/loading dock areas. A third side of the building will contain a four car rail siding. The guard house 208 side on the access road will be fenced and landscaped.

The guard house 208 FIG. 2, can be a modular unit from Heritage Building Systems, Inc. of North Little Rock, Ark. that contains a rest room is air conditioned, heated, and vented. The roof (not shown) can over hang the house 208 on the scale 206 side to provide weather protection to the guard. Phone service and handheld transceivers (not shown) can permit the guard to communicate. A series of conventional TV monitors and lights, 1650 on poles around the center 100 can permit the guard to view key areas of the center night and day. At night, or during center close down the guard electrically operates the gates 202, 1650 from the guard house. Other key management or persons will have control of the gates from inside or outside the grounds. A seventy foot length drive-on scale 206 with capacity up to 70,000 pounds, and capable of weighing trailers up to 48.5 feet in length, can be located at the guard house. Conventional Red/Green light traffic poles 204 can also be utilized to assist track drivers.

Referring back to FIG. 2, a driveup and buy back shredder and security area 220 can be located in a well lighted area just inside the center, near the guard house 208. Because of its neat appearance and convenient location it will encourage use. A driveup area located just inside the center near the entrance ramp 130 can provide private conditions for persons who need to ensure immediate security destruction of material such as Government Classified data, and confidential business records. Also area 220 can include a buy-back area for those persons delivering papers. This service encourages community organizations to conduct paper drives in order to raise cash. The shredding and buy-back areas encourage delivery of high grade papers, provide a community service, and generate good will for future business.

FIG. 10 is a cross-sectional view of the invention of FIG. 2 along arrow X.

In the recycling center, all sorting and processing operations take place indoors which provides weather protection for high grades of paper. The center can be sized to approximately 50,000 square feet and be staffed by approximately fifteen persons and run approximately two and one-half shifts per day by sorting and baling approximately three hundred tons a day of multigrades of paper.

Although, the preferred embodiment describes the processing of wastepaper, the invention can have applicability to sorting other waste materials such as but not limited to aluminum cans.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for the sorting and recycling multiple grade wastepaper comprising the steps of:

delivering collected multiple wastepaper into drop pits;

separating the collected wastepaper at each of the drop pits into a first and second load;

conveying the first load to a storage location;

conveying the second load to a main pit;

presorting the second load at the main pit into a third load and fourth load;

sorting the third load for a preselected grade of wastepaper;

sorting the fourth load the preselected grade of the wastepaper;

baling the preselected grade of the wastepaper; and transporting the baled wastepaper to a second site.

2. The method of claim 1, wherein the drop pits includes: four drop pit sites.

3. The method of claim 2, wherein the drop pits includes: a different wastepaper grade for each drop pit.

4. The method of claim 1, wherein the step of conveying to the storage location includes:

conveying by a swivel conveyor.

5. The method of claim 4, wherein the temporary storage location of waste paper is located external to the drop pit.

6. The method of claim 4, further including the step of:

moving the temporary stored wastepaper to the main pit.

7. A process for the sorting and recycling multiple grades of wastepaper prior to deinking, comprising the steps of:

(a) unloading multiple grades of wastepaper into a drop pit;

(b) separating the drop pit unloaded wastepaper into a first load and a second load;

(c) transferring the first load to a temporary storage pile;

(d) transferring the second load to a main pit;

(e) separating the second load at the main pit into a third load and a fourth load;

(f) separating nonwastepaper material from the second load, wherein remaining paper forms a fifth load;

(g) sorting preselected sized wastepaper from the fourth load wherein the preselected sized wastepaper forms a sixth load;

(h) combining a preselected grade of the wastepaper from the fifth load and the sixth load; and (i) transporting the combined preselected grade of the wastepaper for further recycling.

8. The process for sorting and recycling of claim 7, further comprising the step of:

(j) moving the temporary storage pile to the drop pit; and (k) repeating steps (e) through (i).

9. The process for sorting and recycling of claim 7, the transferring step (c) further includes:

a swivel conveyor for the transferring of the first load to the temporary storage pile.

10. The process for sorting and recycling of claim 7, the transferring step (d) further includes:

a trench conveyor for the transferring of the second load to the main pit.

11. The process for sorting and recycling of claim 7, the separating step (f) further includes:

sensing the nonwastepaper with an x-ray station.

12. The process for sorting and recycling of claim 7, the sorting step (g) further includes:

sorting through a star wheel sorter.

13. The process for sorting and recycling of claim 7, further comprising the steps of:

(j) hand sorting the fifth load at stations; and (k) repeating steps (e) through (i).

14. The process for sorting and recycling of claim 7, the combining step (h) further includes:

baling the preselected grade of the wastepaper from the fifth load and the sixth load.

* * * * *